(12) United States Patent
Komatsu et al.

(10) Patent No.: US 7,137,769 B2
(45) Date of Patent: Nov. 21, 2006

(54) WORKPIECE FEEDING APPARATUS

(75) Inventors: Tetsuharu Komatsu, Utsunomiya (JP); Takaji Mukumoto, Hanno (JP); Satoshi Kanbayashi, Utsunomiya (JP); Junichi Nakano, Utsunomiya (JP); Naoya Matsunaga, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 236 days.

(21) Appl. No.: 10/484,616

(22) PCT Filed: Jul. 24, 2002

(86) PCT No.: PCT/JP02/07473

§ 371 (c)(1),
(2), (4) Date: Jan. 22, 2004

(87) PCT Pub. No.: WO03/010075

PCT Pub. Date: Feb. 6, 2003

(65) Prior Publication Data

US 2004/0247416 A1    Dec. 9, 2004

(30) Foreign Application Priority Data

| Jul. 24, 2001 | (JP) | ............... 2001-223419 |
| Jul. 24, 2001 | (JP) | ............... 2001-223429 |
| Jul. 24, 2001 | (JP) | ............... 2001-223444 |
| May 30, 2002 | (JP) | ............... 2002-157850 |
| May 30, 2002 | (JP) | ............... 2002-158010 |

(51) Int. Cl.
*B61B 3/00* (2006.01)
*B61J 1/06* (2006.01)

(52) U.S. Cl. ............... 414/222.01; 198/465.4; 104/96

(58) Field of Classification Search ............. 198/346.2, 198/465.4, 466.1, 678.1, 681, 686–687.1, 198/348; 414/222.01; 104/96, 98, 99, 112, 104/173.1
See application file for complete search history.

(56) References Cited

U.S. PATENT DOCUMENTS

| 896,499 A | * | 8/1908 | Witthoefft | ............... 104/99 |
| 1,020,046 A | * | 3/1912 | Neller | ............... 104/99 |

(Continued)

FOREIGN PATENT DOCUMENTS

JP    48-30774    9/1973

(Continued)

*Primary Examiner*—Eileen D. Lillis
*Assistant Examiner*—Charles Greenhut
(74) *Attorney, Agent, or Firm*—Birch, Stewart, Kolasch & Birch, LLP

(57) ABSTRACT

A plurality of working blocks (A, B) are connected by rails (18). A branched transporting mechanism (100) is disposed at the intersections of the rails (18). A transportation vehicle (300) of non-self-propelled type moves on the rails (18) by the driving power of a wire (20). A placement table (450) is positioned in the vicinity of the working blocks (A, B). The placement table (450) moves up and down with a workpiece placed thereon between the transportation vehicle (300) and the working blocks (A, B). Transfer of work is effected by moving the placement table (450) up and down, and adjusting the height of the placement table (450) to the height of the transportation vehicle (300) or to the height of the working blocks (A, B). Further, the transportation vehicle (300) has a wire gripping mechanism (350) for gripping the wire (20), and workpiece placement plates (326a, 326b) for placing the workpiece thereon.

14 Claims, 32 Drawing Sheets

U.S. PATENT DOCUMENTS

| | | | |
|---|---|---|---|
| 1,684,986 A * | 9/1928 | Gillies | 104/99 |
| 3,853,068 A * | 12/1974 | Avery | 104/292 |
| 4,005,786 A * | 2/1977 | Adelson et al. | 414/281 |
| 4,036,381 A * | 7/1977 | Nielsen et al. | 414/416.04 |
| 4,917,018 A * | 4/1990 | Loomer | 104/99 |
| 4,920,891 A * | 5/1990 | Loomer | 104/102 |
| 5,062,524 A * | 11/1991 | Nozaki et al. | 198/465.4 |
| 5,111,750 A * | 5/1992 | Nozaki et al. | 104/88.03 |
| 5,154,123 A * | 10/1992 | Loomer | 104/102 |
| 5,697,301 A * | 12/1997 | Sporer | 104/96 |
| 5,947,259 A * | 9/1999 | Leisner et al. | 198/465.3 |
| 6,427,824 B1 * | 8/2002 | Murata et al. | 198/348 |
| 6,499,980 B1 * | 12/2002 | Fledderjohann et al. | 425/34.1 |
| 6,530,466 B1 * | 3/2003 | Murata et al. | 198/465.4 |
| 6,786,323 B1 * | 9/2004 | Schonenberger | 198/678.1 |
| 6,835,040 B1 * | 12/2004 | Quiring | 414/281 |
| 6,877,438 B1 * | 4/2005 | Olbort | 104/88.01 |
| 2002/0179409 A1 * | 12/2002 | Murata et al. | 198/348 |

FOREIGN PATENT DOCUMENTS

| | | |
|---|---|---|
| JP | 50-58783 A | 5/1975 |
| JP | 52-152967 | 11/1977 |
| JP | 56-43116 A | 4/1981 |
| JP | 58-52113 A | 3/1983 |
| JP | 59-69313 A | 4/1984 |
| JP | 60-161825 A | 8/1985 |
| JP | 61-232960 A | 10/1986 |
| JP | 3-182496 A | 8/1991 |
| JP | 4-44213 U | 4/1992 |
| JP | 6-54973 A | 3/1994 |
| JP | 8-39374 A | 2/1996 |
| JP | 9-40169 A | 2/1997 |
| JP | 2694546 B2 | 9/1997 |

* cited by examiner

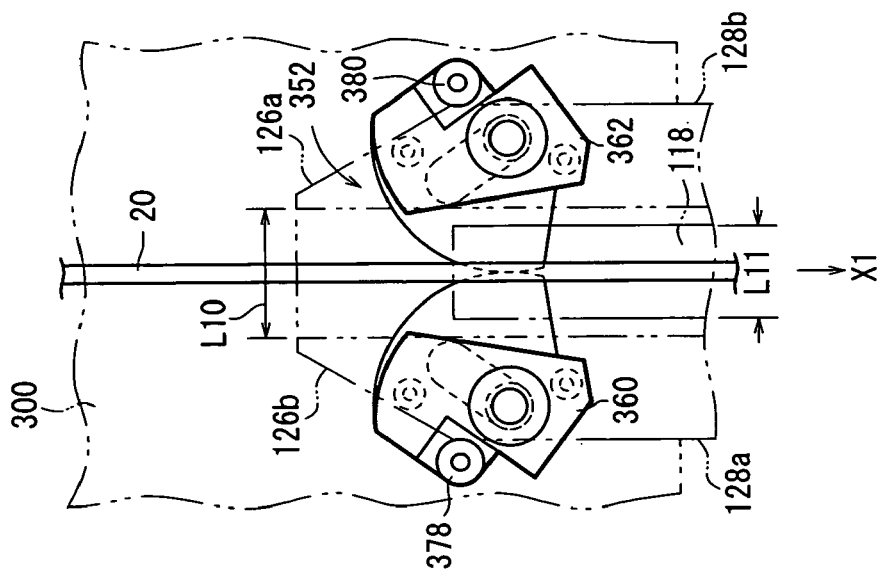
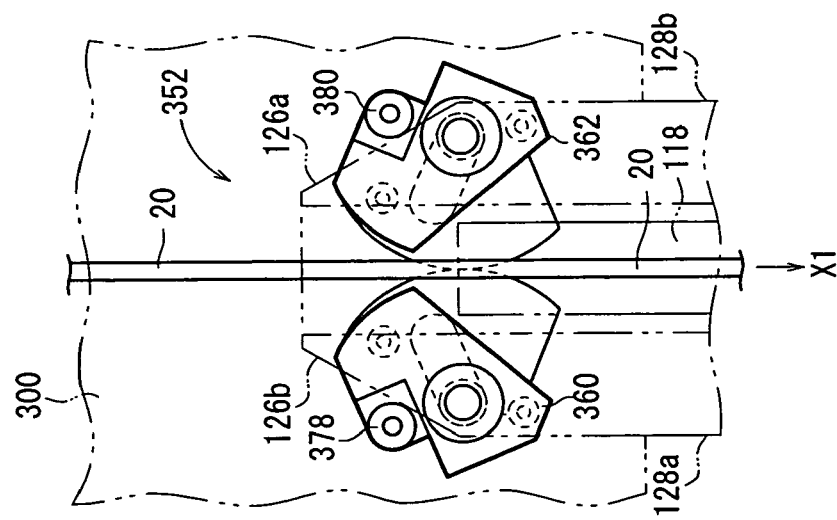
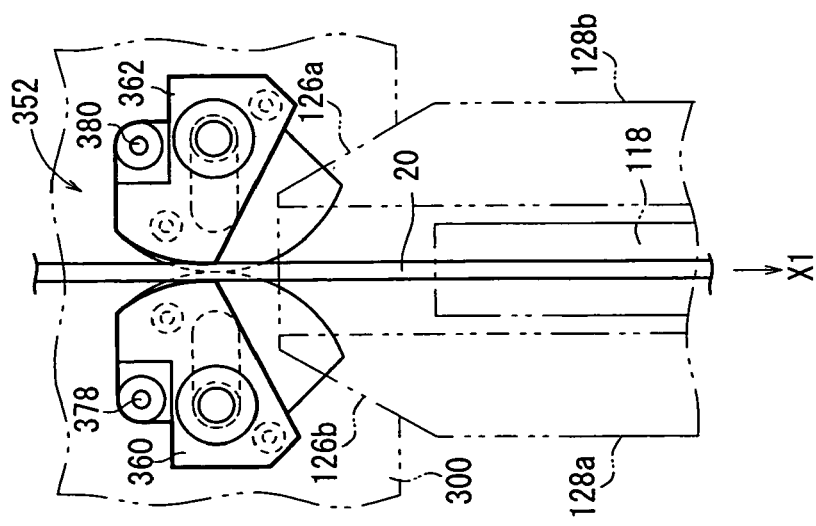

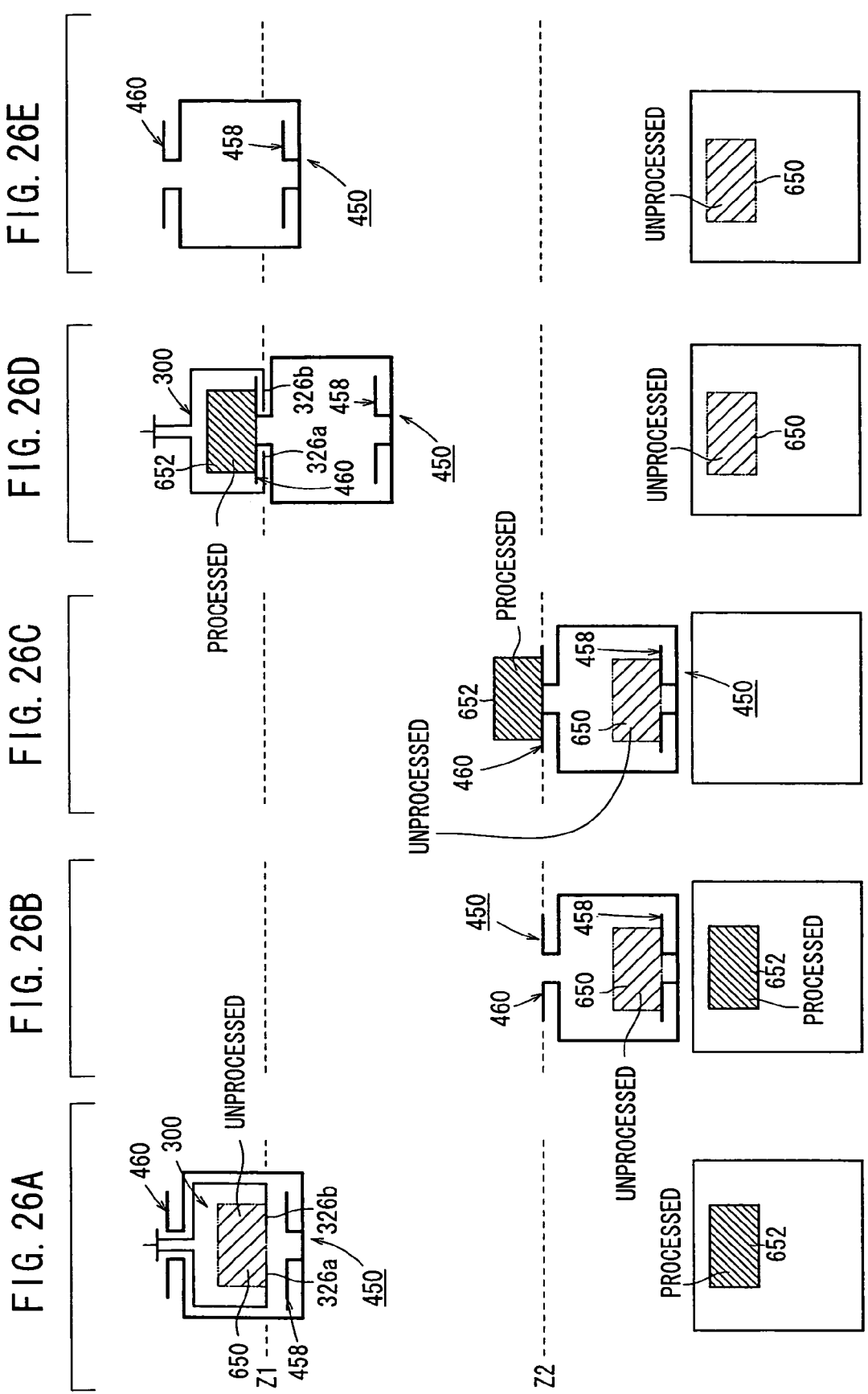

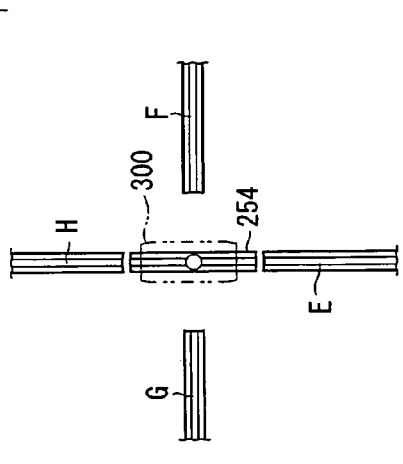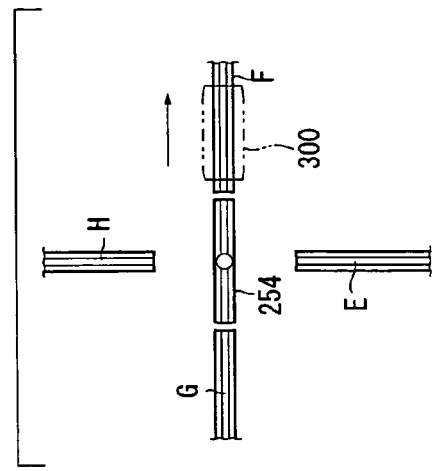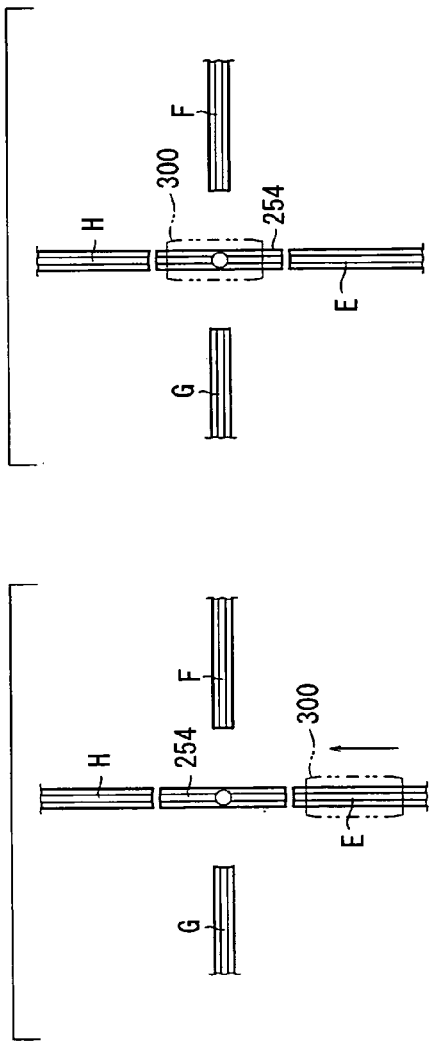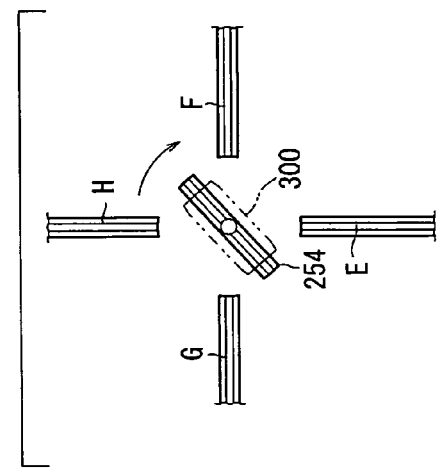

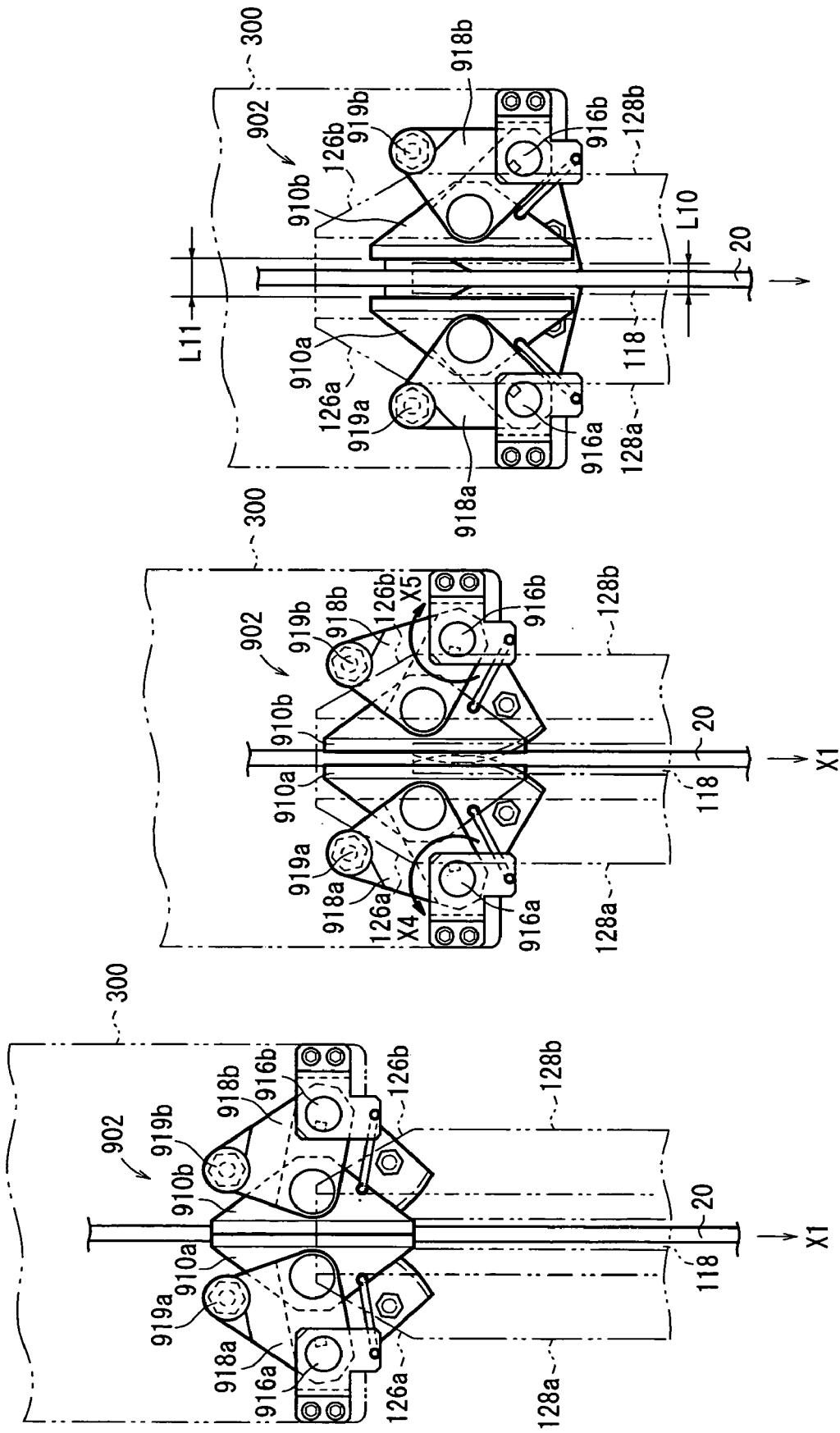

WORKPIECE FEEDING APPARATUS

TECHNICAL FIELD

The present invention relates to a workpiece feeding apparatus for feeding workpieces between a plurality of working blocks.

BACKGROUND ART

There have been known workpiece feeding apparatus for feeding workpieces between a plurality of working blocks. For example, as disclosed in Japanese laid-open patent publication No. 59-69313, a typical known workpiece feeding apparatus has a hanger suspended from a trolley conveyor and having a suspension support disposed in a traveling direction of the hanger, a vertically movable unit that is vertically movable in response to a signal output from the hanger, and a conveyor positioned on an upper portion of the vertically movable unit for passing through the hanger and comprising a plurality of rotatable rollers. A workpiece placed on the hanger can be transferred to the conveyor.

With the above conventional workpiece feeding apparatus, however, the direction in which the hanger moves is limited by the position where the suspension support is mounted. Specifically, the traveling direction of the hanger is one way only, and if the workpiece placed on the hanger has moved past a working block, then it is extremely difficult for the hanger to reach the working block again. When such a situation occurs, the conventional workpiece feeding apparatus suffers a very low efficiency with which to feed workpieces.

According to the above conventional arrangement, furthermore, the workpiece is placed on the hanger, but is not fixed thereto. The workpiece placed on the hanger is transferred to a processing block, for example, where the workpiece is processed in various processing processes. If the workpiece is displaced for some reasons during its transportation, the workpiece may not be processed quickly and accurately. If the workpiece is displaced a large distance, then it may possibly collide with the hanger or fall off the hanger.

The workpiece which is being transported can be prevented from being positionally displaced by a stopper or the like that is mounted on the placement surface of the hanger and shaped complementarily to the workpiece. However, if a plurality of types of workpieces having different shapes are transported or one type of workpieces is transported in various different postures, then there need to have on hand as many stoppers as the number of types of differently shaped workpieces to be transported or as the number of different postures to be taken by one type of workpieces to be transported. As a result, the number of parts used by the workpiece feeding apparatus is increased, and it is necessary to replace the stopper in use each time the workpiece type to be transported is changed or the transporting posture is changed. Accordingly, the efficiency with which the workpiece feeding apparatus operates is lowered.

Japanese laid-open patent publication No. 60-161825 discloses a conventional arrangement having a carriage for traveling along a feed path while gripping a workpiece with a hand, a dedicated elevator for unloading a workpiece from the carriage, and a dedicated elevator for loading a workpiece onto the carriage.

This conventional arrangement can perform parallel feeding operations with the unloading dedicated elevator and the loading dedicated elevator and hence can avoid a reduction in the efficiency with which to feed workpieces. However, the conventional arrangement is likely to suffer a substantial increase in the equipment cost.

With this conventional arrangement, the carriage has the arm for gripping a workpiece, and the workpiece is firmly gripped by the arm and stably supported thereby against positional displacement. However, the arm itself has a complex mechanism and needs electrical control for some actions to be made thereby. Therefore, the arm is relatively complex in structure and highly costly.

Japanese patent No. 2694546 discloses a conventional arrangement comprising tracks arranged in a crisscross pattern, self-propelled transportation vehicles having drive sources and wheels for traveling on the tracks, and switching means disposed at the intersections of the tracks for turning the tracks to change the direction in which the transportation vehicles travel.

Each of the transportation vehicles of this conventional arrangement is of the self-propelled type having its own drive source for moving on tracks toward a desired working block. Since the transportation vehicle itself has its own drive source, it is relatively heavy. If the rate for feeding workpieces is increased for a higher working efficiency to meet a demand for an increased throughput, then the absolute number of transportation vehicles to be used is increased, and the tracks and the switching means for supporting those transportation vehicles are correspondingly rugged and large in size. Consequently, the overall apparatus is highly expensive and needs to occupy an increased installation space.

Furthermore, if a certain transportation vehicle suffers a fault and stops moving in a certain working block, then since the transportation vehicle is of self-propelled type, it has to be repaired on site or removed from the track by some means because the faulty transportation vehicle, if left on the track, would obstruct the operation of other transportation vehicles. When transportation vehicles suffer a failure, therefore, the machining conveyor apparatus tends to undergo a large drop in the operating efficiency.

Moreover, because the self-propelled transportation vehicles are heavy and cannot move at high speeds, the operating efficiency of the machining conveyor apparatus cannot be expected to be largely improved.

Japanese laid-open patent publication No. 8-39374 discloses a conventional arrangement having a pusher mounted on a trolley chain which is movable in one direction, and a trolley having engaging/disengaging mechanisms disposed symmetrically on front and rear sides of the trolley for engaging the pusher only in one direction, the trolley being movable by the drive power of the trolley chain.

The transportation vehicle used in the conventional arrangement is a non-self-propelled transportation vehicle which is movable by the drive power of the trolley chain. Since the trolley chain is flexible, the transportation vehicle tends to stop at different positions rather than a desired accurate position. In addition, the transportation vehicle moves by having engaging/disengaging mechanisms engage grip members mounted at spaced intervals on the trolley chain, and hence cannot move and stop by gripping the trolley chain at any desired position thereon. Consequently, design limitations are posed on working positions in that if the number of trolleys is to be increased to meet a demand for an increased operating efficiency, then the number of grip members on the trolley chain is unable to keep up with the increased number of trolleys, and the operating efficiency cannot be improved as desired.

It is an object of the present invention to provide a workpiece feeding apparatus which is capable of efficiently transferring workpieces to working blocks and is of a simple arrangement.

Another object of the present invention is to provide a workpiece feeding apparatus which allows a non-self-propelled transportation vehicle, if used, to change its transporting direction as desired, is highly reliable in feeding operation, is of a simple arrangement, can be manufactured at a low cost, is prevented from taking up an increased installation space, can feed workpieces efficiently.

Still another object of the present invention is to provide a workpiece feeding apparatus which is highly reliable in positioning workpieces when they are fed, allows a transportation vehicle to grip a wire as a feeding means at any desired positions thereon for increased positioning freedom to increase a production efficiency, and is of a simple arrangement for making products manufactured thereby inexpensive.

Yet another object of the present invention is to provide a workpiece feeding apparatus which allows a transportation vehicle to grip a wire with increased accuracy, and reduces an amount of wear on the wire thereby to increase the durability of the wire.

Yet still another object of the present invention is to provide a workpiece feeding apparatus which allows workpieces to be positioned easily and reliably without the need for dedicated parts when the type of workpieces to be fed is changed or a transporting posture in which to feed workpieces is changed.

DISCLOSURE OF THE INVENTION

According to the present invention, a workpiece feeding apparatus has a workpiece transfer apparatus for transferring a workpiece fed by a transportation vehicle to at least a working position and a transporting position. The workpiece transfer apparatus has a workpiece placement table vertically movable by a drive mechanism. The workpiece placement table has a first workpiece placement surface and a second workpiece placement surface which are vertically spaced from each other by a predetermined distance. The drive mechanism is capable of vertically moving the workpiece placement table and of positioning either one of the first workpiece placement surface and the second workpiece placement surface in a fixed position to place or release a workpiece on the transportation vehicle.

With the above arrangement, since the drive mechanism vertically moves and positions the workpiece placement table, the workpiece does not need to be vertically moved by the transportation vehicle and a working machine when it is to be transferred. Therefore, the transportation vehicle and the working machine do not require a mechanism for vertically moving the workpiece and a control device for controlling such a mechanism, resulting in a simple structure. Furthermore, because the workpiece is transferred in the fixed position, it can be transferred to a working block efficiently.

According to the present invention, a workpiece feeding apparatus has a feeding apparatus for feeding a workpiece on a plurality of rails held in an elevated position. The feeding apparatus comprising a branched transporting mechanism disposed between the rails which are arranged in a crisscross pattern, transporting means for moving along the rails, and a non-self-propelled transportation vehicle for transporting the workpiece by engaging and disengaging the transporting means. The branched transporting mechanism receives the transportation vehicle transported by the transporting means and a first one of the rails and delivers the transportation vehicle to a second one of the rails. The branched transporting mechanism has a rotating mechanism for rotating the transportation vehicle when the transportation vehicle is delivered from the first rail to the second rail.

With the above arrangement, the non-self-propelled transportation vehicle can be transported in a desired direction in combination with the branched transporting mechanism, and a fault due to a failure of the transportation vehicle or the like can be avoided. Therefore, the time and cost required are reduced. The workpiece, which has been difficult to transport at high speeds, can easily be transported at high speeds for increased working efficiency. Furthermore, since the transportation vehicle is driven by the wire, it is made less flexible, and can be fed and positioned with reliability. Moreover, as the transportation vehicle can grip the wire at any desired positions, it is easy to increase the number of transportation vehicles used, resulting in an increased feeding efficiency.

According to the present invention, a workpiece feeding apparatus has a wire gripping device for bringing a non-self-propelled transportation vehicle into engagement with a moving wire to feed the transportation vehicle to a desired position and releasing the transportation vehicle from the wire at the desired position. The wire gripping device has first clamp means and second clamp means mounted on the transportation vehicle. The first clamp means clamps the wire when the wire rotates in a normal direction and the second clamp means unclamps the wire when the wire rotates in the normal direction, and the first clamp means unclamps the wire when the wire rotates in a reverse direction and the second clamp means clamps the wire when the wire rotates in the reverse direction.

With the above arrangement, since the transportation vehicle is self-locked in the direction in which the wire moves, the mechanism for gripping the wire is made simple. As the wire can be gripped at any desired position, the freedom with which to position the transportation vehicle increases. The production efficiency is thus increased, and the structure of the workpiece feeding apparatus is simplified.

According to the present invention, a workpiece feeding apparatus has a workpiece transfer apparatus for transporting workpieces having different shapes between working blocks. The workpiece transfer apparatus comprises a plurality of positioning plates having space regions complementary to the profiles of the workpieces, respectively, and a drop prevention plate for preventing the workpieces from dropping off. The positioning plates are stacked upwardly in an increasing order of the space areas. The drop prevention plate is disposed beneath the lowest positioning plate.

With the above arrangement, even if the type of workpieces to be transported is changed, it is not necessary to use dedicated components, but all types of workpieces can stably be transported and reliably be positioned. As the workpiece feeding apparatus can handle workpieces having various shapes or positioned in various postures, the workpieces can easily be processed in a next process, and the freedom with which to use the workpiece feeding apparatus increases.

BRIEF DESCRIPTION OF THE DRAWINGS

FIGS. 17A through 17C are views showing successive stages of a procedure for the wire gripping mechanism to release the wire;

FIGS. 26A through 26E are views showing successive stages of a procedure for transferring workpieces;

FIGS. 27A through 27D are views showing successive stages of a procedure for the branched transporting mechanism to branch the direction of a transportation vehicle;

FIGS. 32A through 32C are views showing successive stages of a procedure for the wire gripping mechanism according to the other embodiment shown in FIGS. 28 through 31 to release a wire.

BEST MODE FOR CARRYING OUT THE INVENTION

Workpiece feeding apparatus according to preferred embodiments of the present invention will be described in detail below with reference to the accompanying drawings.

Figure 1:
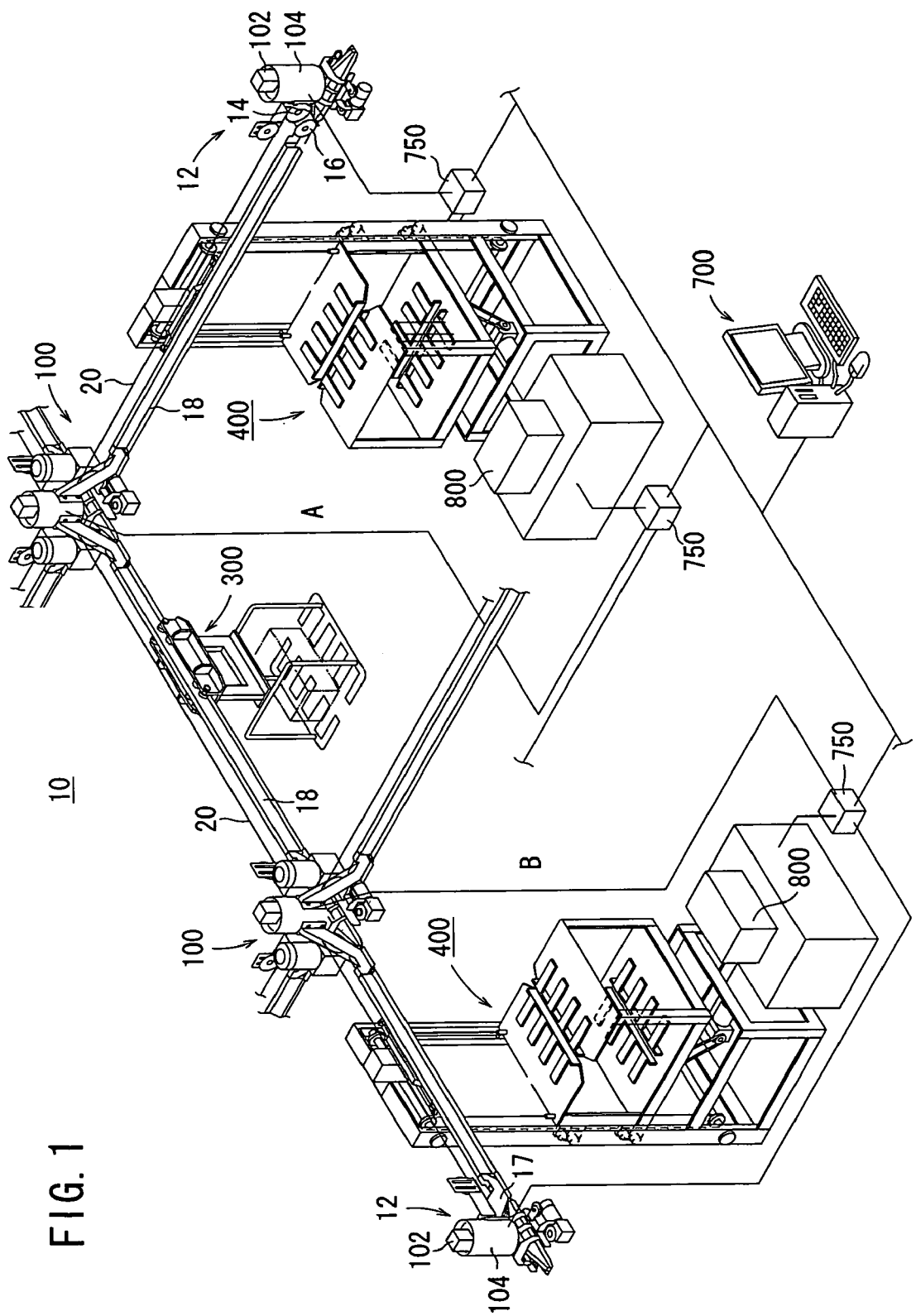
FIG. 1 is a schematic perspective view of a workpiece feeding apparatus according to an embodiment of the present invention.

As shown in FIG. 1, a workpiece feeding apparatus 10 according to an embodiment of the present invention is basically disposed in a production system that is made up of a plurality of working blocks arranged in a crisscross pattern. The production system comprises a mechanical production system in which a workpiece that has been processed in one working block is moved by the workpiece feeding apparatus 10 to another working block where the workpiece is processed. For illustrative purposes, it is assumed that the production system according to the present embodiment has a working block A and a working block B.

As shown in FIG. 1, the working block A and the working block B are basically coupled to each other by rails. The working block A and the working block B have respective end transportation mechanisms 12 kept at a predetermined height. Each of the end transportation mechanisms 12 has upper and lower pulleys 14, 16 rotatably supported therein which are slightly displaced from each other. Each of the end transportation mechanisms 12 has a set of legs 17 between which the pulleys 14, 16 are supported.

Figure 2:
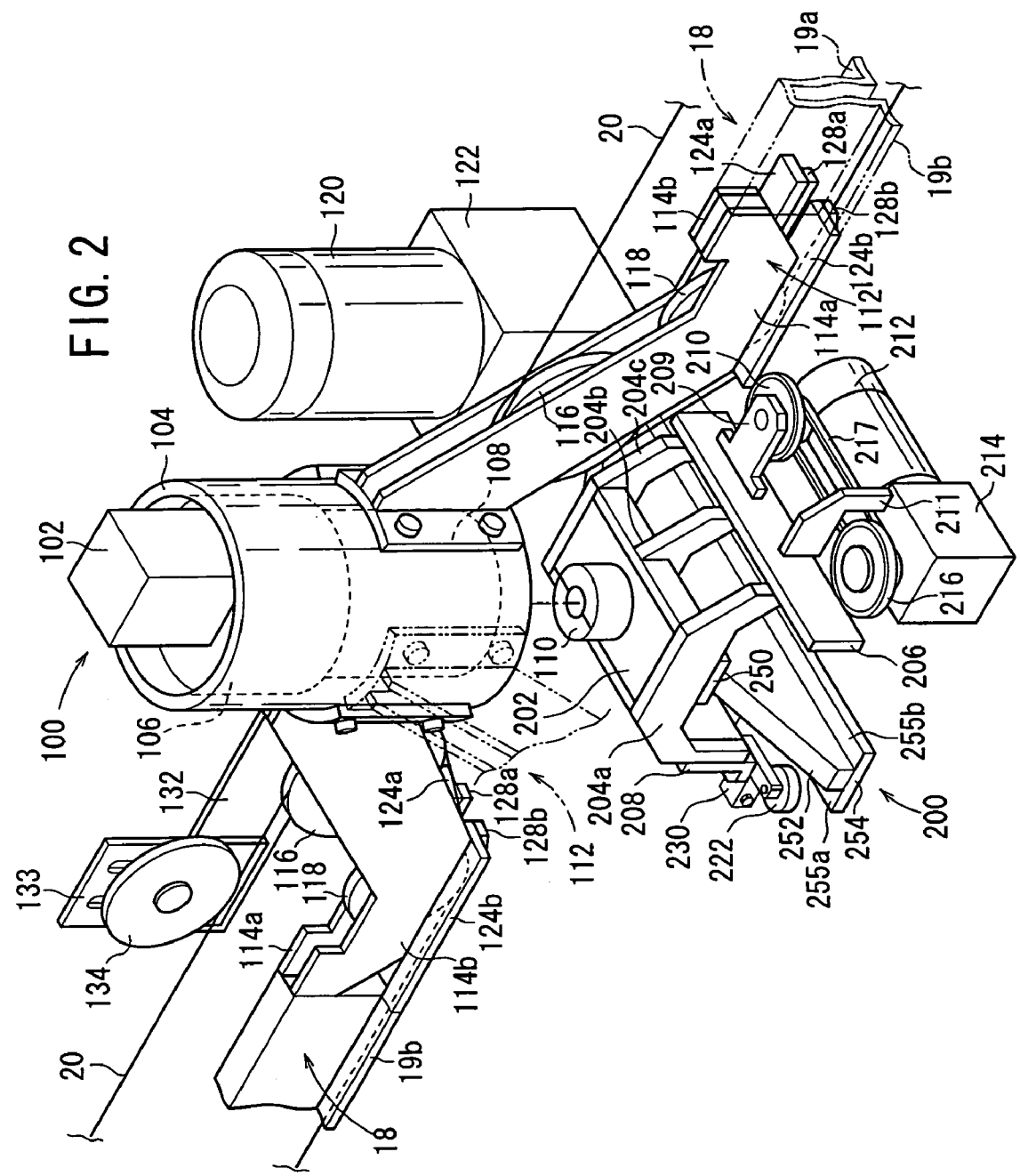
FIG. 2 is a schematic perspective view of the structure of a branched transporting mechanism.

A rail 18 is held on the distal ends of the legs 17. As shown in FIG. 2, the rail 18 is of an inverted U-shaped cross-sectional shape bent from a metal plate and has lower ends 19a, 19b extending in respective opposite directions. The wheels of transportation vehicles, described later, are rollingly placed on the lower ends 19a, 19b.

A wire 20 extending as a loop along the rail 18 has a loop end trained around the pulleys 14, 16. The wire 20 has an opposite loop end trained around pulleys 116, 118 of a branched transporting mechanism 100 to be described later. As shown in FIG. 1, the wire 20 extends from a position above the rail 18 to the pulley 14, is curved downwardly around the pulley 14, then extends from the pulley 16 into a space defined between the lower ends 19a, 19b of the rail 18, and extends as an endless loop to the branched transporting mechanism 100. The end transportation mechanisms 12 have a main structure which is basically identical in part to the main structure of the branched transporting mechanism 100, and will not be described in detail below.

Figure 3:
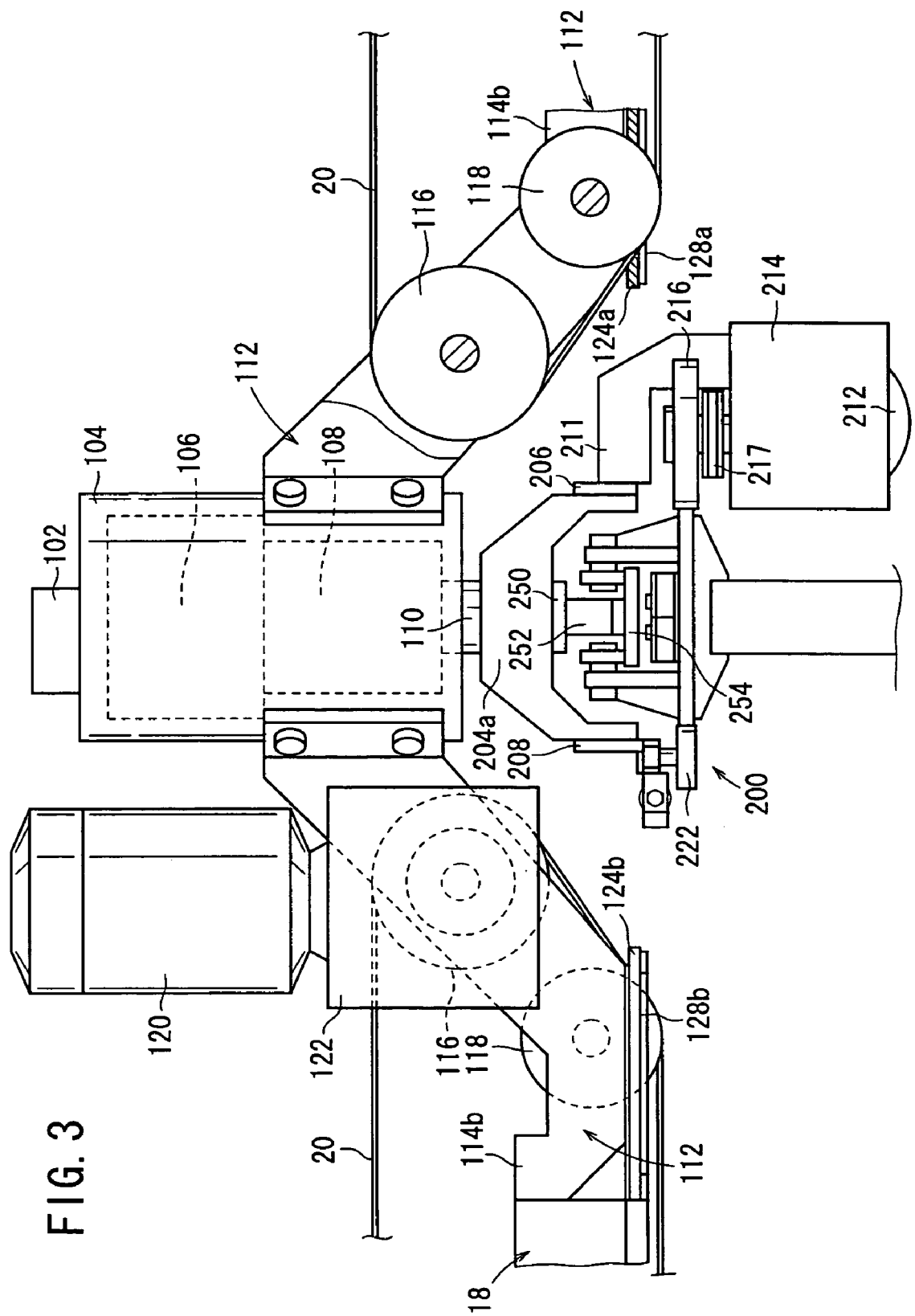
FIG. 3 is a schematic front elevational view of the structure of the branched transporting mechanism.

The branched transporting mechanism 100 will be described below. The branched transporting mechanism 100 is held in an elevated position. The branched transporting mechanism 100 has a substantially cylindrical body 104 housing therein a motor 106 (second drive source) and a gear train 108 directly coupled to the rotational shaft (not shown) of the motor 106. In FIGS. 1 through 3, the motor 106 is associated with an encoder 102 for detecting the rotational angle of the motor 106.

As shown in FIG. 3, a shaft 110 mounted on the distal end of the gear train 108 has a lower end exposed downwardly from the cylindrical body 104. Pulley holding legs 112 are fixed to an outer circumferential wall of the cylindrical body 104. Each of the legs 112 has a pair of flat plates 114a, 114b extending obliquely downwardly, with pulleys 116, 118 being rotatably supported between the flat plates 114a, 114b that are spaced a predetermined distance from each other. The pulley 116 is positioned slightly upwardly of the pulley 118, and is coupled to a motor 120 (first drive source) that is held on the cylindrical body 104 through a gear train 122.

Specifically, the rotational drive power of the motor 120 is reduced in speed by the gear train 122 and applied to rotate the pulley 116. The wire 20 is trained around the pulleys 14, 16 of the end transporting mechanism 12 and the pulleys 116, 118 of the branched transporting mechanism 100.

Actually, as shown in FIGS. 1 and 2, the branched transporting mechanism 100 has four legs 112 mounted on the outer circumferential wall of the cylindrical body 104 and angularly spaced at 90° from adjacent ones of the legs 112. The motor 120 and the gear train 122 are fixed to at least two legs 112 that are disposed in symmetrical positions. Those legs 112 which are free of the motor 120 and the gear train 122 are associated with wires 20 that are trained around the pulleys 14, 16 of companion end transporting mechanisms 12 which are equipped with motors 120 and gear trains 122. Therefore, each wire 20 is actuated by the motor 120 and the gear train 122 of either one of the branched transporting mechanism 100 and the end transporting mechanism 12 that are associated with that wire 20.

As shown in FIG. 2, guide plates 124a, 124b that are spaced a predetermined distance from each other are fixed to the respective lower ends of the flat plates 114a, 114b of each of the legs 112. The guide plates 124a, 124b are kept at substantially the same height as the lower ends 19a, 19b of the rail 18. Wire grip release plates 128a, 128b comprising flat plates which have tapered distal ends 126a, 126b (see FIGS. 17A through 17C) are secured to the respective lower ends of the guide plates 124a, 124b.

A support plate 132 extending from the cylindrical body 104 may be attached to one of the legs 112, and, as shown in FIG. 2, a tension pulley 134 (tension adjusting means) may be rotatably supported so as to be vertically movable on a position adjustment plate 133 mounted on the distal end of the support plate 132. The tension pulley 134 serves to apply a predetermined tension to the wire 20 that is trained around the pulleys 14, 16, 116, 118.

Identical components of the end transporting mechanisms 12 and the branched transporting mechanisms 100 are denoted by identical reference characters, and will not be described in detail below.

In the present embodiment, a rotating mechanism 200 which is rotatable in unison with the shaft 110 is disposed below the shaft 110. The rotating mechanism 200 has a horizontal plate 202 fixed to the end of the shaft 110 and holding brackets 204a, 204b, 204c disposed at spaced intervals and fixed to the horizontal plate 202.

The holding brackets 204a, 204b, 204c have lower ends interconnected by a plate 206 mounted thereon and other lower ends interconnected by a plate 208 mounted thereon.

A large-diameter driven roller 210 is mounted on the plate 206 by a holder 209, and a motor 212 (third drive source) is also mounted on the plate 206 by a holder 211. The rotational drive power of the motor 212 is reduced in speed by a gear train 214 and applied to rotate a drive roller 216.

The drive roller 216 and the driven roller 217 have substantially the same diameter, and are operatively connected to each other by a belt 217.

Figure 4:
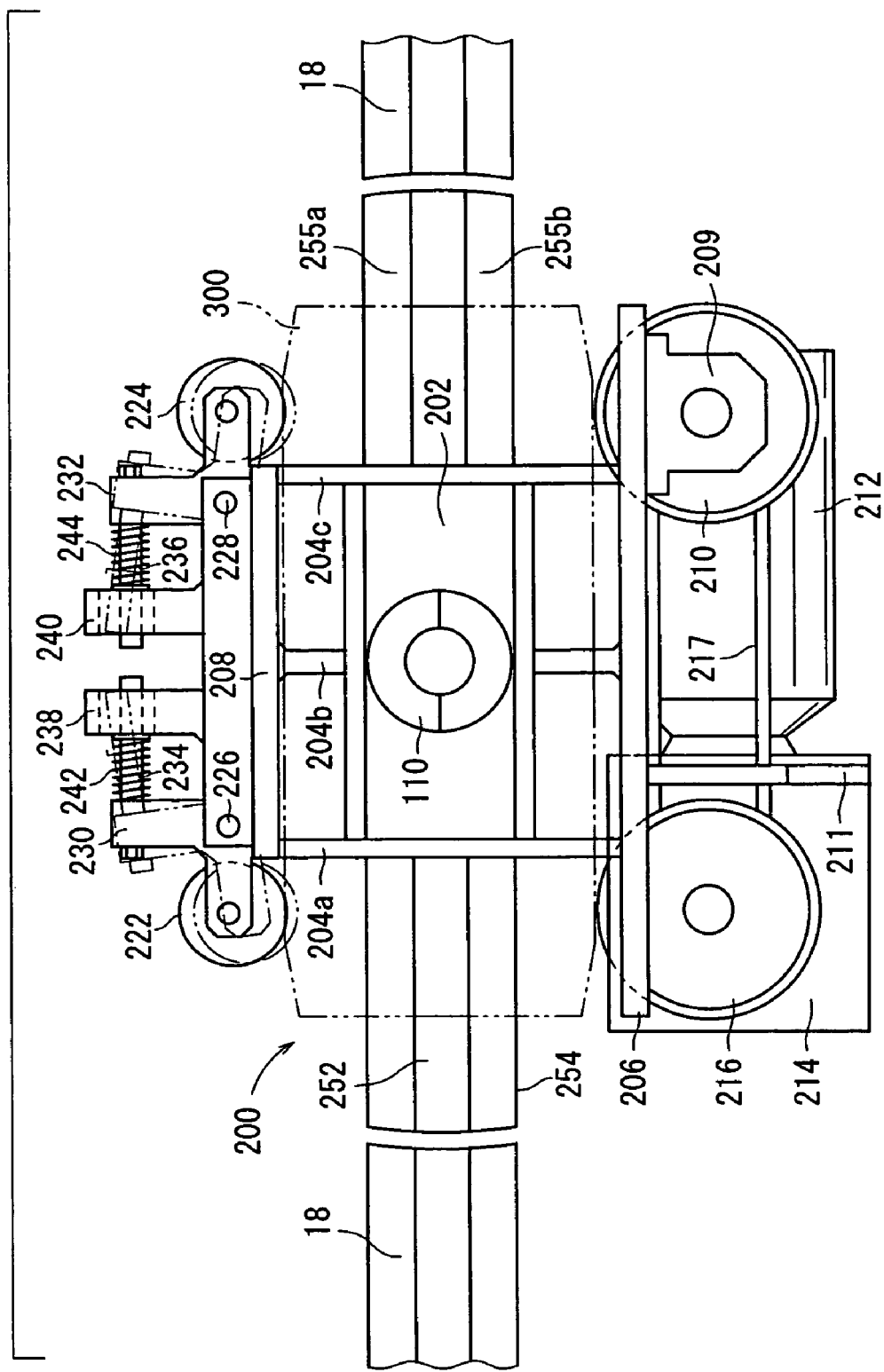
FIG. 4 is a schematic plan view of the structure of a rotating mechanism.

FIG. 4 shows in plan the structure of the rotating mechanism 200. Support shafts 226, 228 are supported on the plate 208, and L-shaped holding arms 230, 232 are angularly movably mounted on the respective support shafts 226, 228. Driven rollers 222, 224 are rotatably held on respective ends of the holding arms 230, 232. Shafts 234, 236 are mounted on respective other ends of the holding arms 230, 232. Coil springs 242, 244 are disposed around the respective shafts 234, 236 and interposed between the other ends of the holding arms 230, 232 and support bars 238, 240 mounted on the plate 208.

The driven rollers 222, 224 are biased under the resiliency of the coil springs 242, 244 to move toward the drive roller 216 as indicated by the two-dot-and-dash lines in FIG. 4.

A plate 250 is disposed below the horizontal plate 202, i.e., within the holding brackets 204a, 204b, 204c, and a plate 252 is fixed to the plate 250 perpendicularly thereto. A turn plate 254 is fixed to a lower portion of the plate 252.

The turn plate 254 has steps providing guide regions 255a, 255b on elongate opposite sides thereof for rollers of a transportation vehicle 300, described later, to roll thereon. As can be seen from FIG. 2, the guide regions 255a, 255b have substantially the same width and height as the lower ends 19a, 19b of the rail 18 and the guide plates 124a, 124b.

Figure 5:
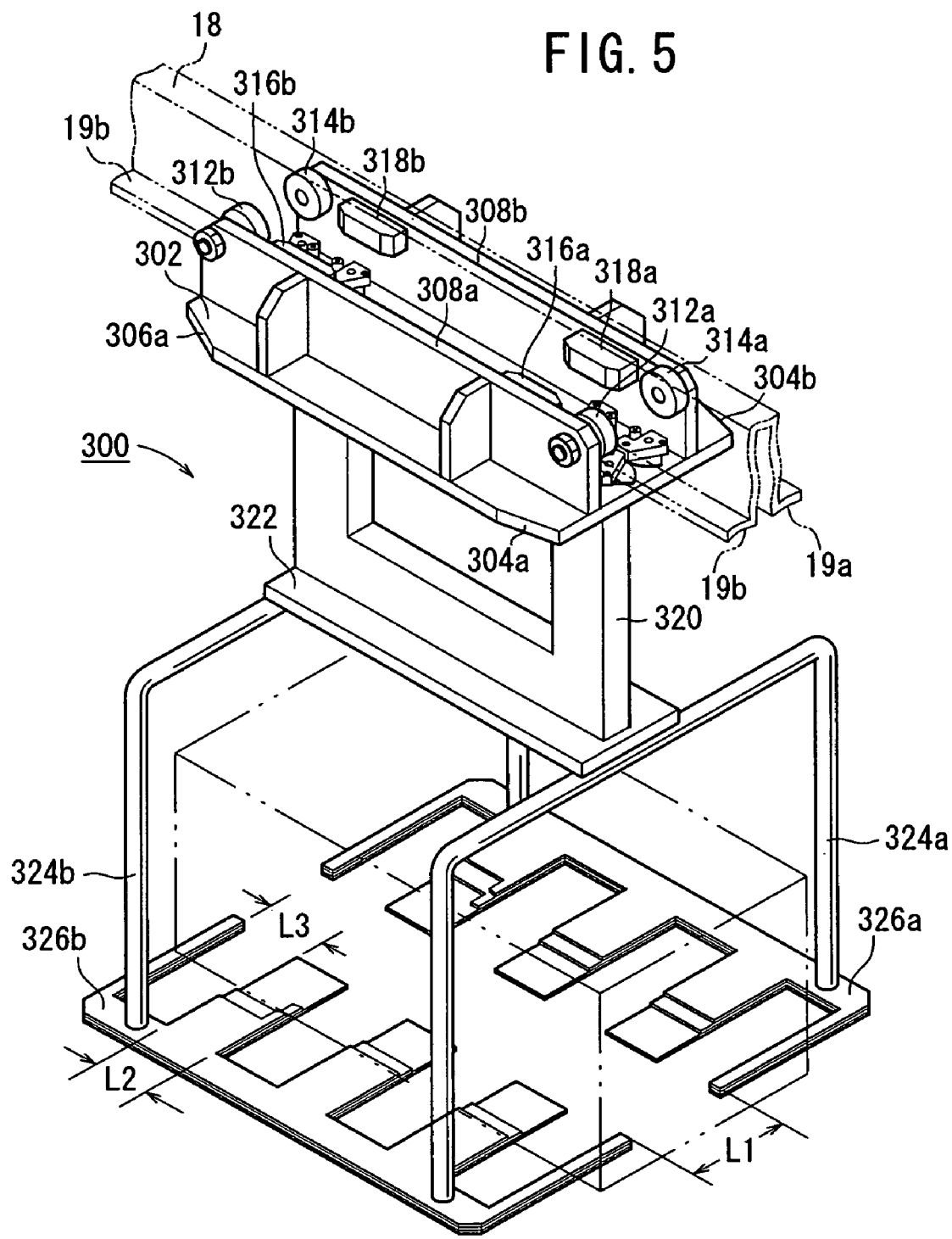
FIG. 5 is a schematic perspective view of the structure of a transportation vehicle.

The transportation vehicle 300 which feeds a workpiece for the branched transporting mechanism 100 to transport the workpiece in a different direction will be described below with reference to FIG. 5.

Figure 7:
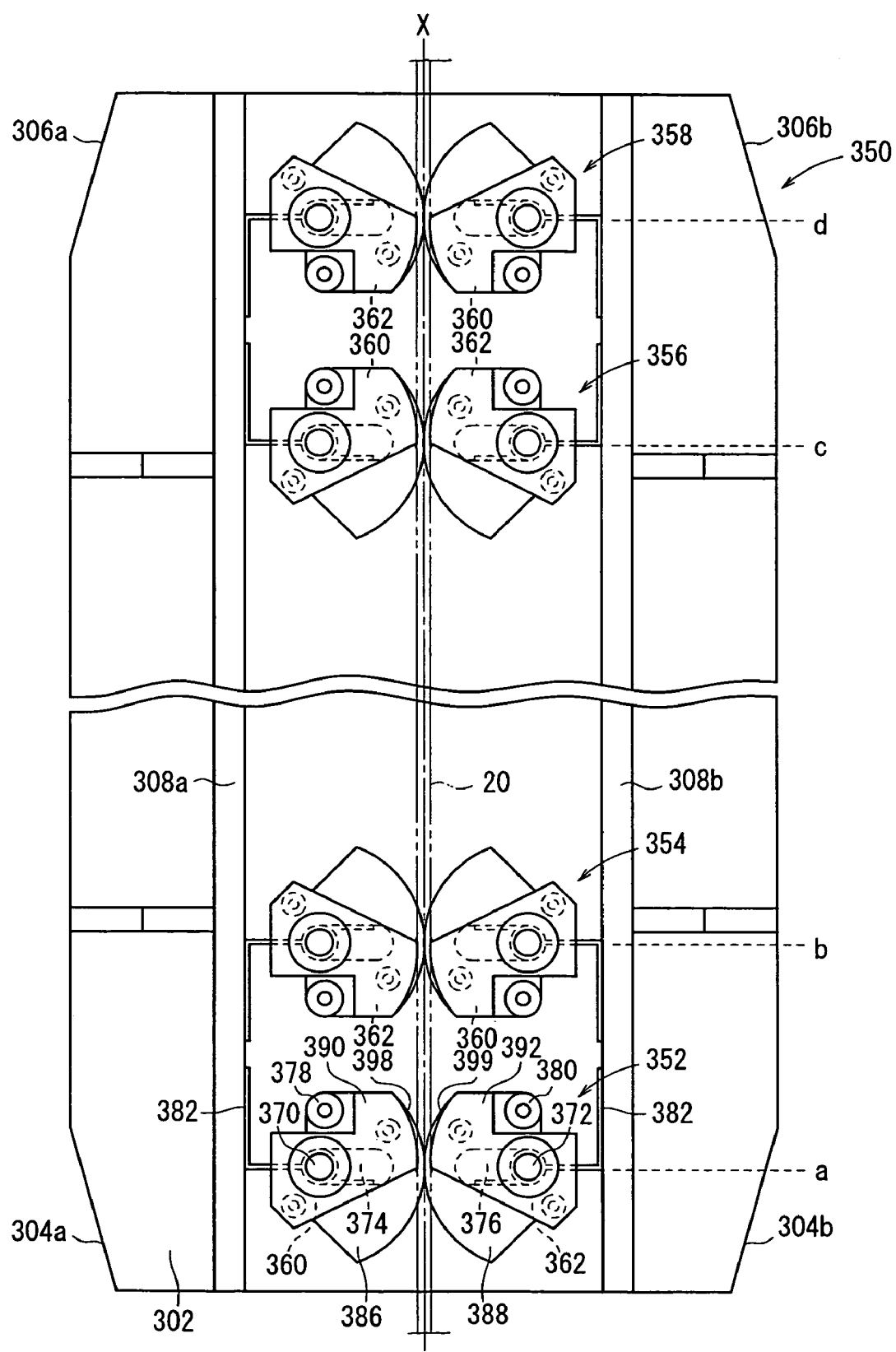
FIG. 7 is a fragmentary plan view of the structure of the wire gripping mechanism.

The transportation vehicle 300 includes a support base 302 having tapered surfaces 304a, 304b on one end thereof and tapered surfaces 306a, 306b on the other end thereof (see FIG. 7). A pair of holder plates 308a, 308b are erected on the support base 302, and rollers 312a, 312b and rollers 314a, 314b are rotatably supported on the respective holder plates 308a, 308b.

Substantially rectangular guides 316a, 316b, 318a, 318b made of synthetic resin are fixed to the holder plates 308a, 308b at positions inwardly of the rollers 312a, 312b, 314a, 314b. A plate 320 extends downwardly from the lower surface of the support base 302, and substantially U-shaped rods 324a, 324b are fixed to respective opposite ends of a plate 322 that is mounted on the lower end of the plate 320.

The rods 324a, 324b hold workpiece placement plates 326a, 326b, respectively. As shown in FIG. 5, the workpiece placement plates 326a, 326b comprise comb-toothed flat plates spaced from each other by a distance L. Each of the workpiece placement plates 326a, 326b has teeth that are spaced from adjacent ones by a distance L3. Structural details of the workpiece placement plates 326a, 326b will be described later.

A wire gripping mechanism 350 incorporated in the transportation vehicle 300 will be described below. The wire gripping mechanism 350 serves to transport the transportation vehicle 300 with the wire 20, and cooperate with the branched transporting mechanism 100 in changing the direction in which the transportation vehicle 300 is transported.

Figure 6:
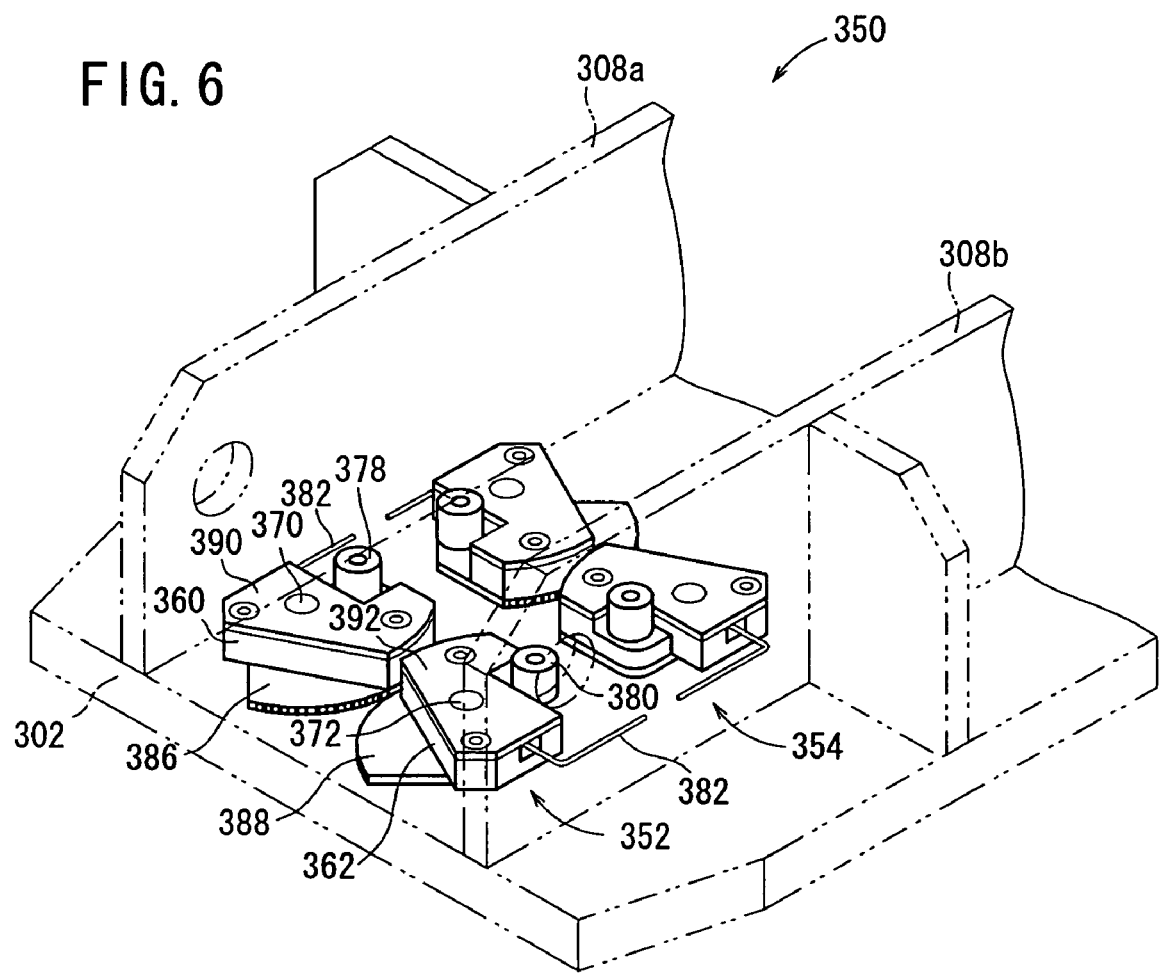
FIG. 6 is a perspective view of the main structure of a wire gripping mechanism.
Figure 8:
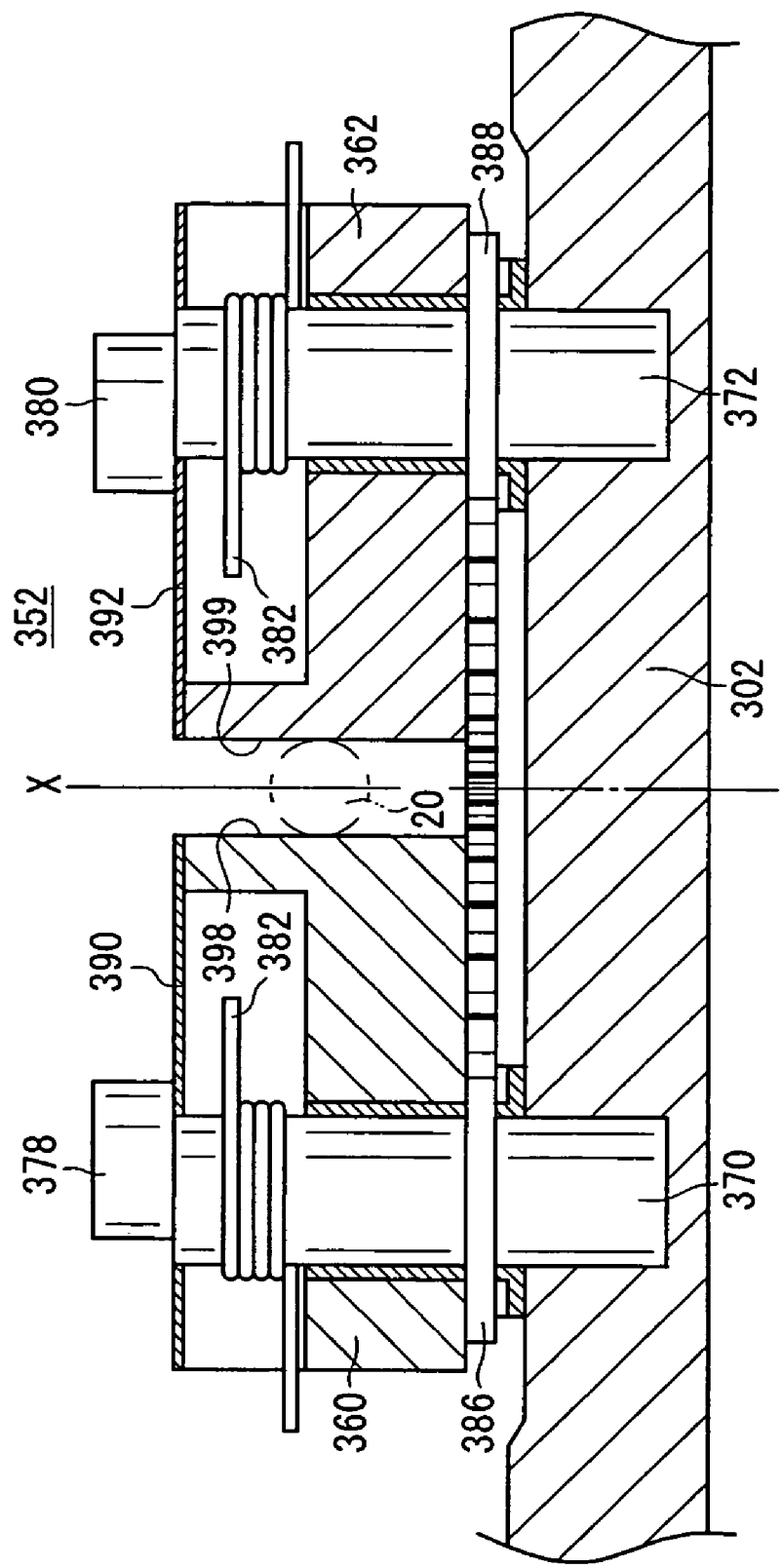
FIG. 8 is a fragmentary vertical cross-sectional view of the structure of the wire gripping mechanism.

FIGS. 6 through 8 show the structure of the wire gripping mechanism 350. The wire gripping mechanism 350 is mounted on the upper surface of the support base 302. A line X represents a central line of the wire gripping mechanism 350 and also a center of movement of the wire 20 to be gripped. The wire 20 can be rotated in opposite directions on the line X. The wire gripping mechanism 350 comprises a first grip unit 352, a second grip unit 354, a third grip unit 356, and a fourth grip unit 358 which are disposed at respective positions a, b, c, d on the upper surface of the support base 302, as shown in FIG. 7.

Each of the first through fourth grip units 352, 354, 356, 358 has cams 360, 362 each having an arcuate surface. The cams 360, 362 are disposed axially symmetrically on both sides of the line X. The cams 360, 362 are disposed differently in the first through fourth grip units 352, 354, 356, 358. In the first and third grip units 352, 356, the cam 360 is disposed on the left side of the line X and the cam 362 is disposed on the right side of the line X in FIG. 7. In the second and fourth grip units 354, 358, the cam 362 is disposed on the left side of the line X and the cam 360 is disposed on the right side of the line X, in angular positions turned 180° from those in the first grip unit 352, in FIG. 7. The first through fourth grip units 352, 354, 356, 358 have a common mechanism for gripping the wire 20 though their cams 360, 362 are mounted in different directions.

The cam 360 is disposed on the left side of the line X with a wire gripping surface 398 directed toward the line X. The cam 360 is rotatably supported on a rotational shaft 370 that is mounted on the support base 302 of the transportation vehicle 300. A spring 382 is disposed around the rotational shaft 370 and has an end seated on a holder plate 308a that is erected on the support base 302 and an opposite end seated in a chamber 374 that is defined in the cam 360.

A gear 386 is pivotally supported on the lower surface of the cam 360 with a toothed surface directed toward the line X, and a cover 390 is fixed to the upper surface of the cam 360. A cylindrical cam releaser 378 projecting upwardly is fixedly mounted on the cam 360. The cover 390, the cam 360, and the gear 386 are of a three-layer structure as shown in FIG. 8.

The cam 362 is disposed on the right side of the line X with a wire gripping surface 399 directed toward the line X. The cam 362 is rotatably supported on a rotational shaft 372 that is mounted on the support base 302. A spring 382 is disposed around the rotational shaft 372 and has an end seated on a holder plate 308b that is erected on the support base 302 and an opposite end seated in a chamber 376 that is defined in the cam 362. A gear 388 is fixed to the lower surface of the cam 362 with a toothed surface directed toward the line X, and a cover 392 is fixed to the upper surface of the cam 362. A cylindrical cam releaser 380 projecting upwardly is fixedly mounted on the cam 362. The cover 392, the cam 362, and the gear 388 are of a three-layer structure (see FIG. 8).

The numbers of teeth of the gears 386, 388 are equal to each other, and the gears 386, 388 operate as synchronizing gears for preventing the cams 360, 262 from differing in angular displacements. The covers 390, 392 are of such a structure that they overlap each other when the cams 360, 362 grip the wire 30, and hence have a function to prevent the wire 20 from being released.

On the line X, a point on the wire gripping surface 398 and a point on the wire gripping surface 399 grip the wire 20, the gears 386, 388 mesh with each other, and the covers 390, 392 face each other in covering relation to the line X.

Specifically, when the first grip unit 352 and the third grip unit 356 are in a clamping state, the second grip unit 354 and the fourth grip unit 358 are in an unclamping state, and when the first grip unit 352 and the third grip unit 356 are in an unclamping state, the second grip unit 354 and the fourth grip unit 358 are in a clamping state.

A lifting/lowering apparatus 400 for bringing a workpiece transported by the transportation vehicle 300 thus constructed into a processing apparatus will be described below. The lifting/lowering apparatus 400 is generally disposed between the end transporting mechanism 12 and the branched transporting mechanism 100, and positioned in the vicinity of the rail 18 (see FIG. 1).

Figure 9:
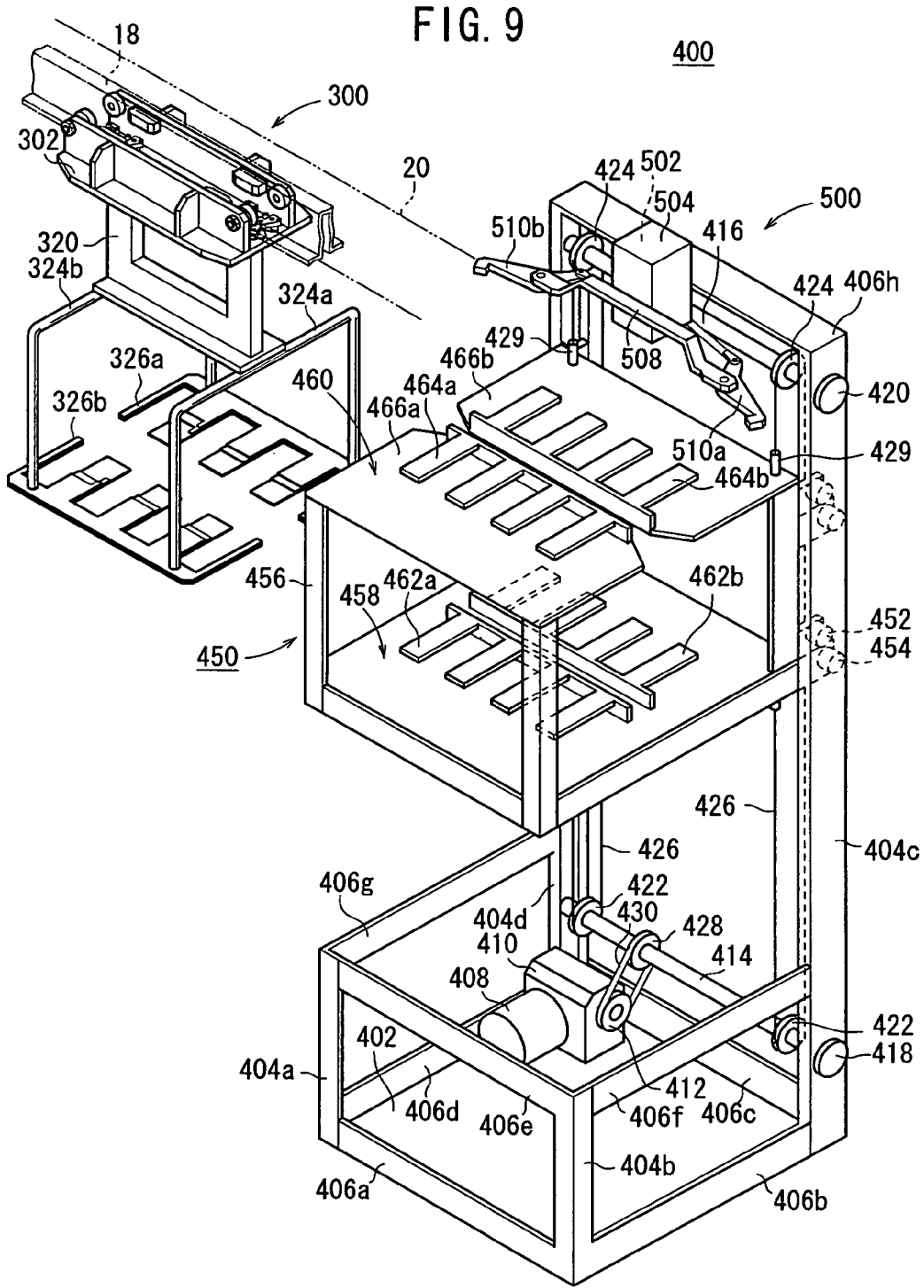
FIG. 9 is a schematic perspective view of the structure of a lifting/lowering apparatus.

As shown in FIG. 9, the lifting/lowering apparatus 400 includes a base 402 and a plurality of frames 404a through 404d extending upwardly from the base 402. Of the frames 404a through 404d, the frames 404c, 404d have a height reaching a position near the wire 20. Beams 406a through 406h are transversely mounted on the frames 404a through 404d. A motor 408 is disposed in the frames 404a through 404d of the base 402, and has a rotatable drive shaft (not sown) connected by a gear train 410 to a pulley 412.

The lifting/lowering apparatus 400 has a lower shaft 414 and an upper shaft 416 which extend transversely between the frames 404c, 404d and have opposite ends rotatably supported by respective pairs of bearings 418, 420. Sprockets 422, 424 are fixed to the lower shaft 414 and the upper shaft 416 near their opposite ends. Chains 426 are trained around the upper and lower sprockets 422, 424. A pulley 428 is fixedly mounted on the lower shaft 414, and a belt 430 is trained around the pulley 412 and the pulley 428. A placement table 450 (workpiece placement table) is fixed to the chains 426 by fixtures 429.

The placement table 450 includes a plurality of rollers 452, 454 projecting therefrom which roll on the frames 404c, 404d that are of a U-shaped cross-section for traveling in the vertical direction in FIG. 9. The placement table 450 includes a rectangular framework 456 on which there are disposed a first placement surface 458 (first workpiece placement surface) and a second placement surface 460 (second workpiece placement surface) that are vertically spaced from each other by a predetermined distance. Actually, the first placement surface 458 has first and second comb-toothed placement members 462a, 462b, and the second placement surface 460 also has first and second comb-toothed placement members 464a, 464b.

The first and second placement members 462a, 462b of the first placement surface 458 are spaced from each other by a predetermined distance. The second placement surface 460 comprises a first plate 466a and a second plate 466b. The first and second placement members 464a, 464b of the second placement surface 460 are fixed respectively to the first plate 466a and the second plate 466b. The first plate 466a and the second plate 466b are spaced from each other by a predetermined distance, and have confronting end faces whose corners are tapered so as to provide spreading edges. When the transportation vehicle 300 reaches the lifting/lowering apparatus 400, the plate 320 of the transportation vehicle 300 can easily enter the gap between the first and second placement members 464a, 464b.

Figure 10:
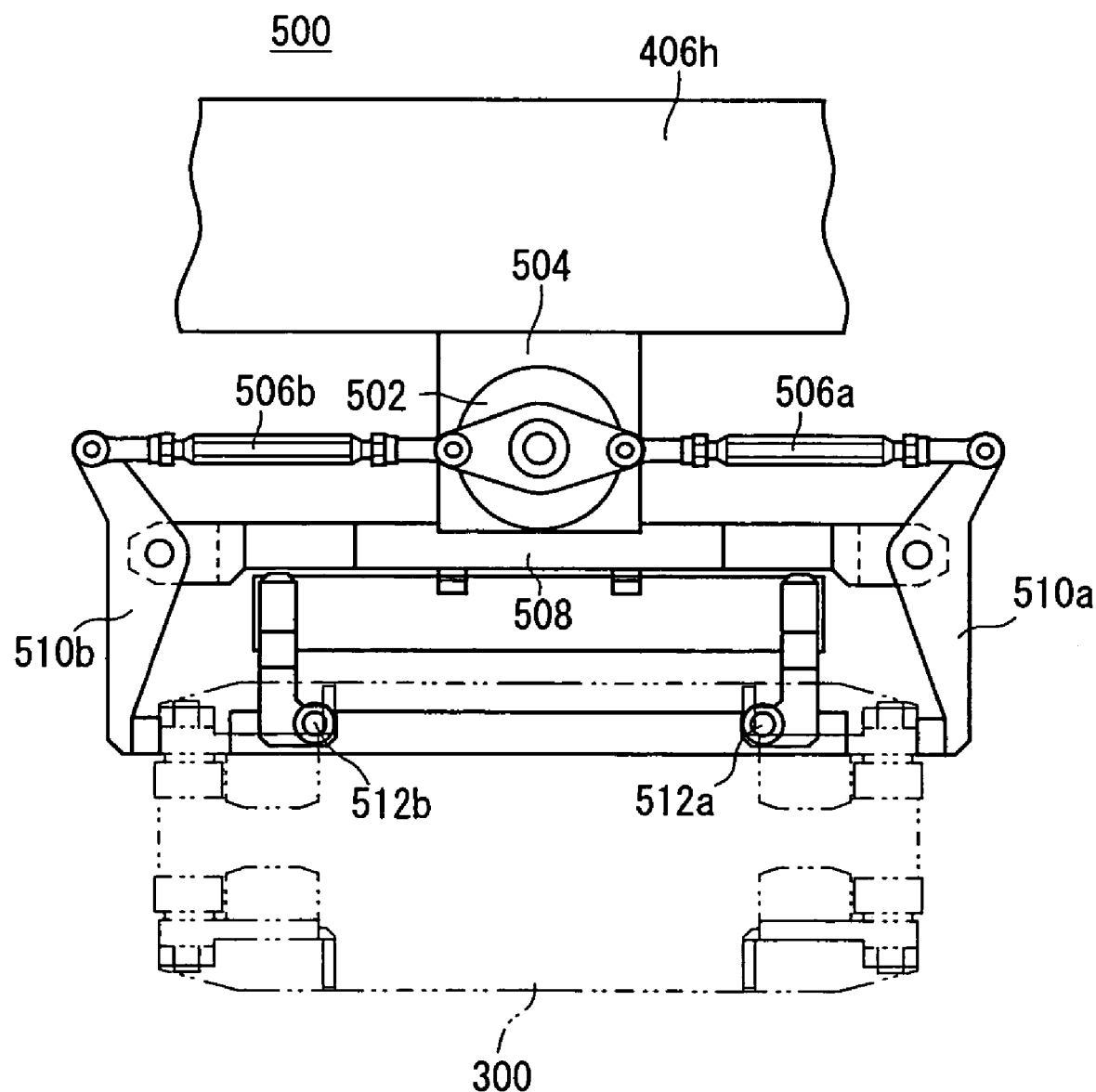
FIG. 10 is a schematic plan view of a fixing device with fingers closed.
Figure 11:
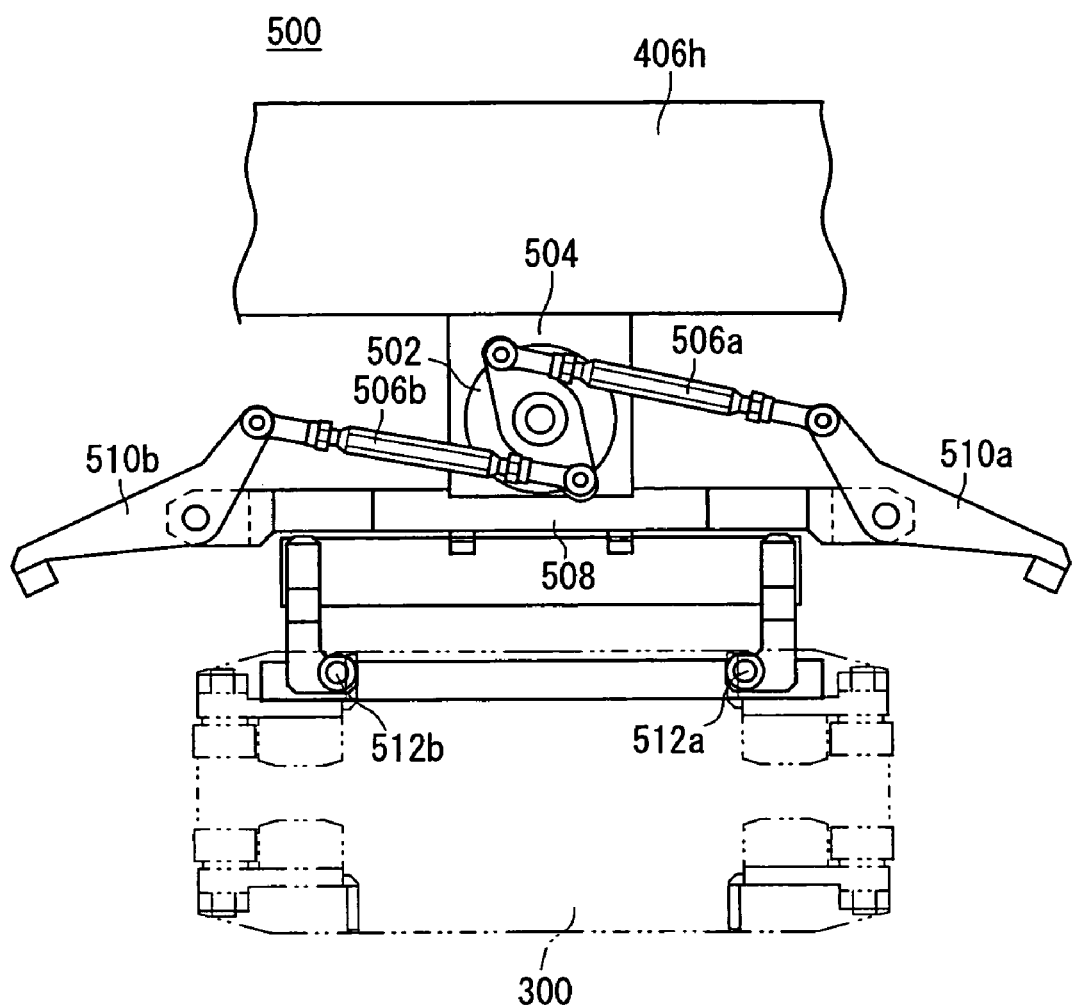
FIG. 11 is a schematic plan view of the fixing device with the fingers open.

A fixing device 500 for temporarily positioning and fixing the transportation vehicle 300 is mounted on an upper portion of the lifting/lowering apparatus 400 (see FIGS. 10 and 11). The fixing device 500 comprises a housing 504 accommodating therein a drive source 502 comprising a rotary actuator, rods 506a, 506b projecting outwardly from the drive source 502, an arm 508 secured to the housing 504, and bent fingers 510a, 510b swingably supported on the arm 508. The fingers 510a, 510b have respective ends pivotally supported respectively on the rods 506a, 506b. When the rods 506a, 506b are retracted or extended by the drive source 502, the other ends of the fingers 510a, 510b are opened and closed. In FIGS. 10 and 11, the reference characters 512a, 512b represent position detecting sensors.

Figure 12:
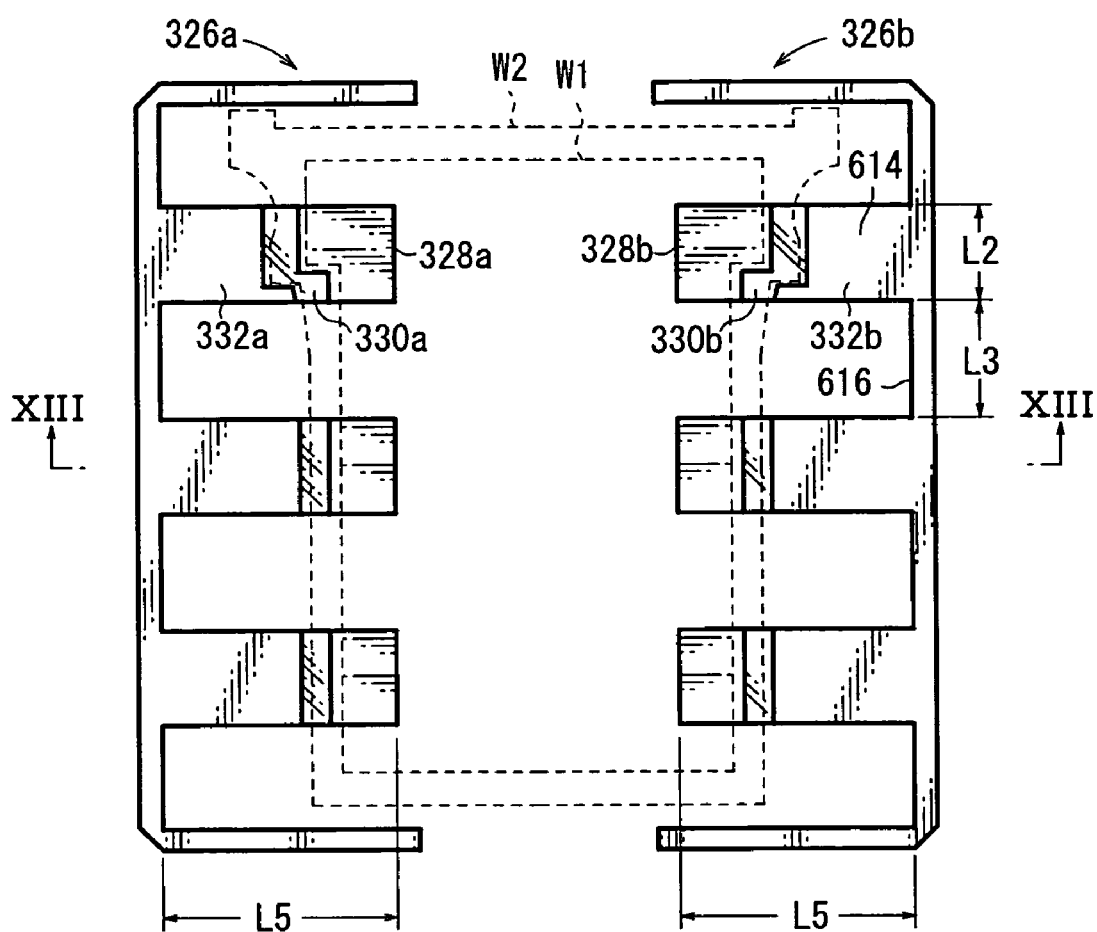
FIG. 12 is a schematic plan view of the structure of a workpiece placement plate of the transportation vehicle.
Figure 13:
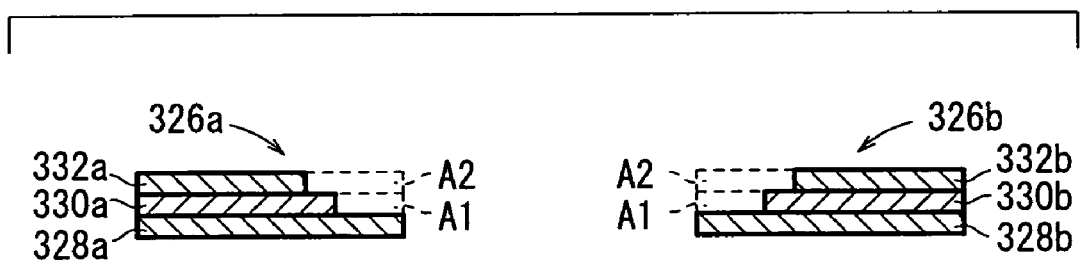
FIG. 13 is a vertical cross-sectional view taken along line XIII—XIII of FIG. 12.

The transportation vehicle 300 which is used in conjunction with the lifting/lowering apparatus 400 and the fixing device 500 will be described in detail below. As shown in FIGS. 12 and 13, the workpiece placement plates 326a, 326b of the transportation vehicle 300 comprise respective first plates 328a, 328b (drop prevention plates), second plates 330a, 330b (positioning plates), and third plates 332a, 332b (positioning plates), that are successively stacked upwardly in the order named.

Figure 14:
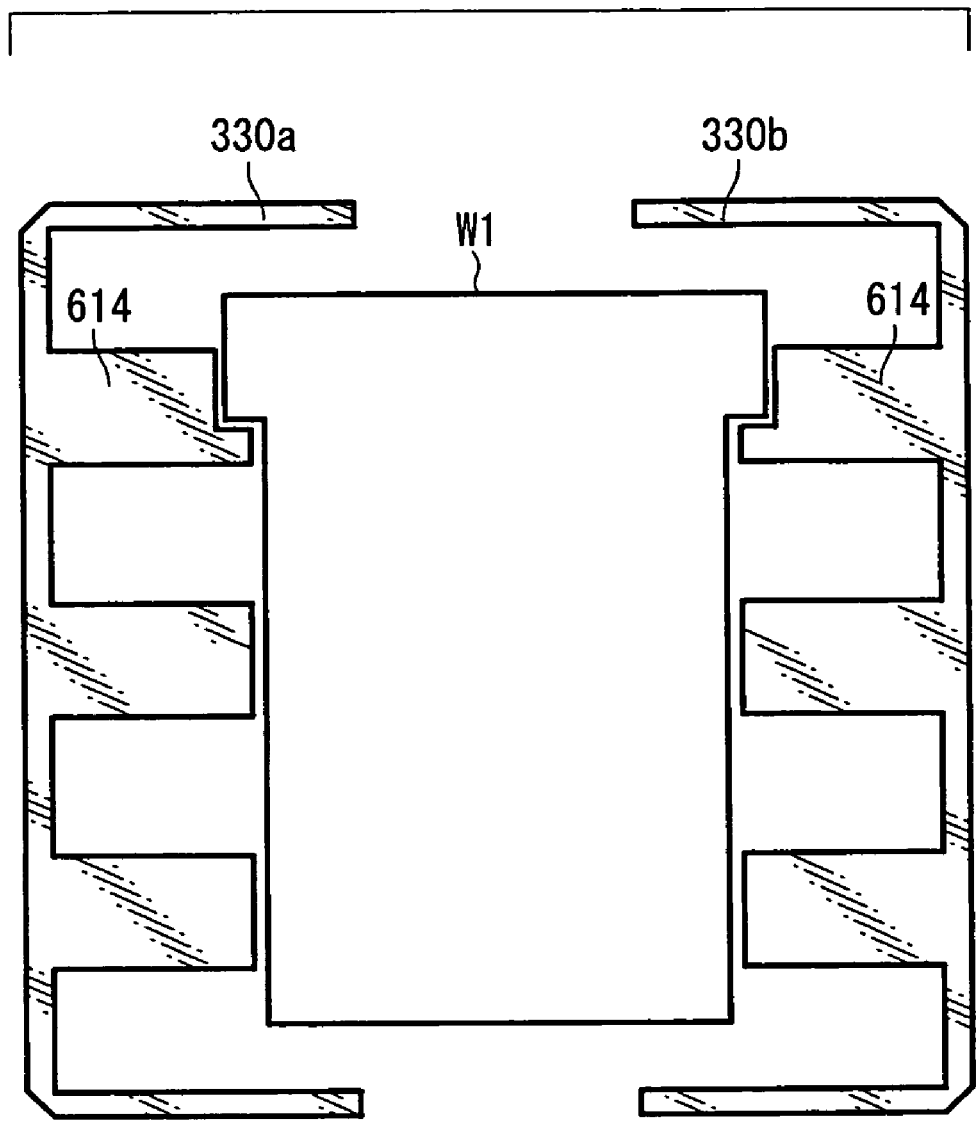
FIG. 14 is a plan view of the structure of a second plate incorporated in the workpiece placement plate shown in FIG. 12.
Figure 15:
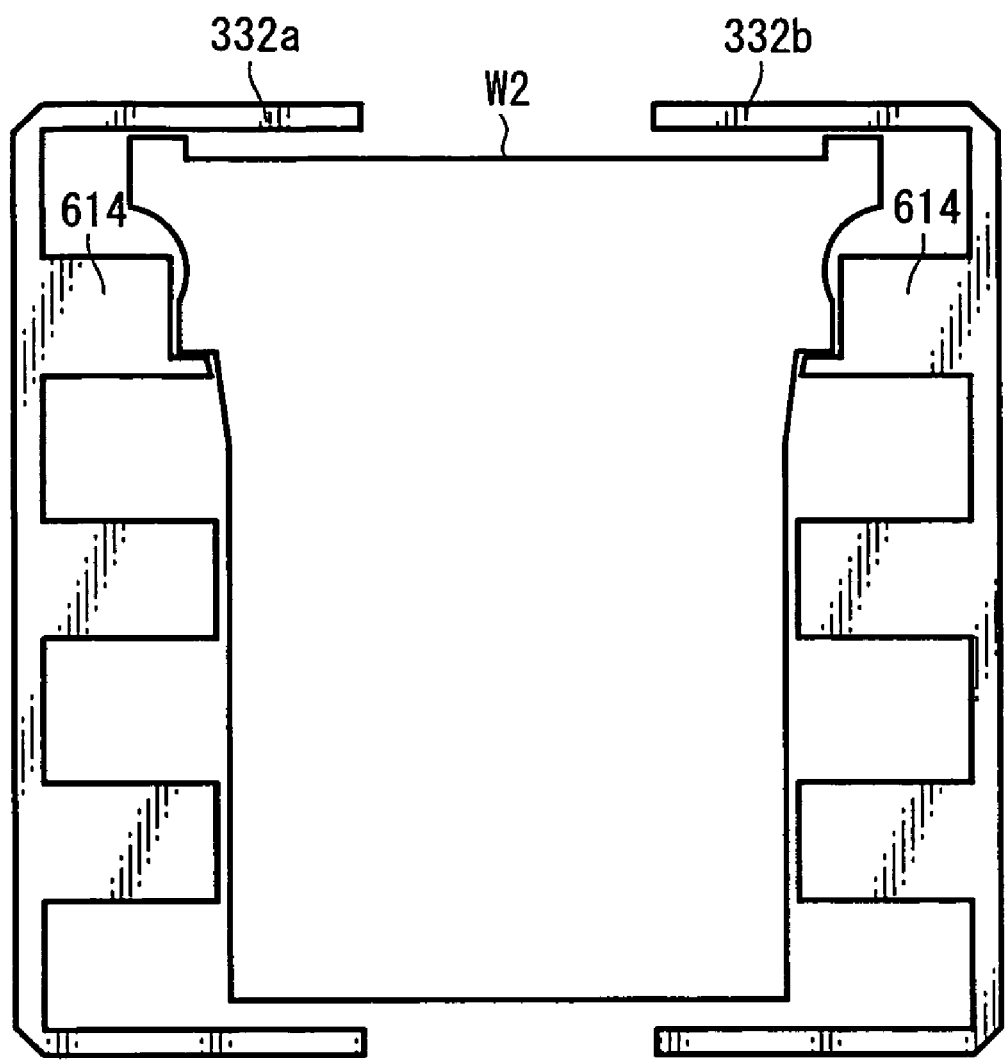
FIG. 15 is a plan view of the structure of a third plate incorporated in the workpiece placement plate shown in FIG. 12.

The first plates 328a, 328b comprise comb-toothed flat plates. As shown in FIG. 12, the first plates 328a, 328b have teeth 614 each having a width L2 and a length L5 and recesses 616 each having a width L3, the teeth 614 and the recesses 616 alternating with each other. As shown in FIG. 14, the second plates 330a, 330b have teeth which are similar to the teeth 614 of the first plates 328a, 328b, but cut out along the profile of a workpiece W1 to provide a space area complementary to the workpiece W1. As shown in FIG. 15, the third plates 332a, 332b have teeth which are similar to the teeth 614 of the first plates 328a, 328b, but cut out along the profile of a workpiece W2 to provide a space area complementary to the workpiece W2. As a result, as shown in FIG. 13, the second plates 330a, 330b provide a space area A1 complementary to the workpiece W1, and the third plates 332a, 332b provide a space area A2 complementary to the workpiece W2.

The workpiece W1 and the workpiece W2 have different shapes, respectively, and the workpiece W1 is smaller in size than the workpiece W2. The profile of the workpiece W1 is different in shape from the profile of the workpiece W2. The space area A1 complementary to the profile of the workpiece W1 is fully included in the space area A2 complementary to the profile of the workpiece W2.

In FIG. 1, the end transporting mechanisms 12 and the branched transporting mechanisms 100 in the working blocks A, B are electrically connected to auxiliary controllers 750, which are electrically connected to a main controller 700. In FIG. 1, the reference character 800 represents a workpiece processing station.

The workpiece feeding apparatus 10 according to the present embodiment is basically constructed as described above. Operation and advantages of the workpiece feeding apparatus 10 will be described below.

Figure 16:
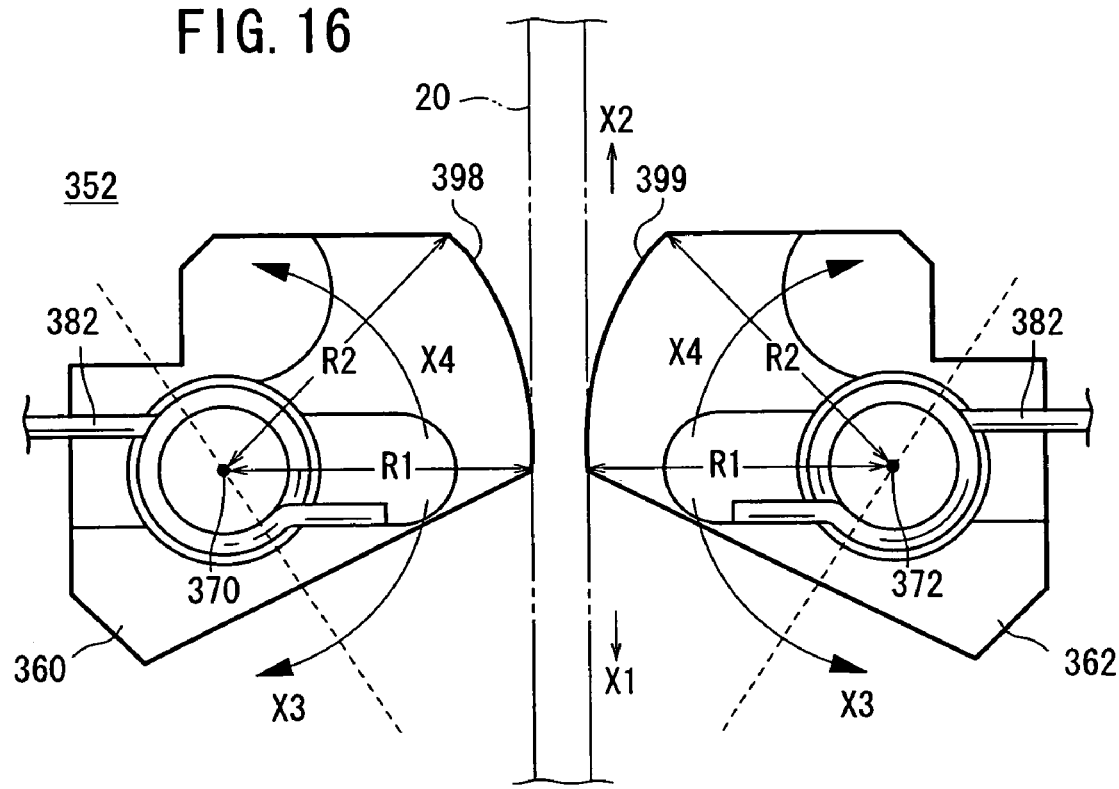
FIG. 16 is a view illustrative of the manner in which the wire gripping mechanism shown in FIGS. 6 through 8 operates to grip a wire.

FIG. 16 shows the first grip unit 352 for gripping the wire 20. Since the first through fourth grip units 352, 354, 356, 358 have a common mechanism and operate in the same manner for gripping the wire 20 though they are mounted in different directions, the first grip unit 352 will be described below. For the sake of clarity, the gears 386 388 and the covers 390, 392 are omitted from illustration in FIG. 16.

The wire gripping surface 398 of the cam 360 have opposite ends that are spaced different distances from the rotational shaft 370. Specifically, if the distance from the rotational shaft 370 to one end of the wire gripping surface 398 is represented by R1 and the distance from the rotational shaft 370 to the other end of the wire gripping surface 398 is represented by R2, then the distances R1, R2 are related to each other as R1<R2. The cam 362 is of a structure identical to the cam 360.

As described above, the wire gripping surface 298 of the cam 360 is differently spaced from the rotational shaft 370 at its opposite ends and the wire gripping surface 299 of the cam 362 is also differently spaced from the rotational shaft 372 at its opposite ends. With this structure, the first grip unit 352 grips the wire 20 when the wire 20 rotates in a normal direction (the direction indicated by the arrow X1) and does not grip the wire 20 when the wire 20 rotates in the reverse direction (the direction indicated by the arrow X2).

The springs 382 urge the cams 360, 362 to turn in the respective directions indicated by the arrows X3 for holding the wire gripping surfaces 398, 399 of the cams 360, 362 in contact with the wire 20 at all times. Consequently, the wire gripping mechanism 350 is self-locked by the rotational drive force of the wire 20 depending on the direction in which the wire 20 rotates (normal direction or reverse direction).

The wire gripping mechanism 350 grips the wire 20 based on the above operation. Furthermore, as shown in FIG. 7, the wire gripping mechanism 350 has the first grip unit 352 disposed in the position a and the second grip unit 354, whose angular position is turned 180° from the first grip unit 352 about the line X, disposed in the position b. With this arrangement, when the wire 20 moves in the direction indicated by the arrow X1 (rotates in the normal direction), the second grip unit 354 grips the wire 20, and the first grip unit 352 does not grip the wire 20. Inasmuch as the mechanisms for gripping the wire 20 are provided with respect to the respective directions in which the wire 20 rotates (the normal direction and the reverse direction), therefore, the wire 20 can be gripped irrespective of the direction in which the wire 20 rotates. However, if the wire 20 rotates in only the normal direction or the reverse direction, then either one of the first grip unit 352 and the second grip unit 354 may be employed.

As shown in FIG. 7, the wire gripping mechanism 350 also has the third grip unit 356, which is oriented in the same direction as the first gripping unit 352, disposed in the position c and the fourth grip unit 358, which is oriented in the same direction as the second gripping unit 354, disposed in the position d. With this arrangement, it is possible to grip the wire 20 at two positions in each of the rotating directions (the normal direction and the reverse direction), so that the wire 20 can be gripped with increased reliability and the transportation vehicle 300 is stabler in posture when transported.

FIGS. 17A through 17C are views showing successive stages of a procedure in which the wire grip release plates 128a, 128b release the wire 20 from the wire gripping mechanism 350. Usually, the transportation vehicle 300 is released from the rotational drive action of the wire 20 when its direction is branched by the branched transporting mechanism 100, and stops its motion at the spot where it is released from the wire 20. Therefore, the branched transporting mechanism 100 has the wire grip release plates 128a, 128b for releasing the wire 20 from the wire gripping mechanism 350. As described above, since the first through fourth grip units 352, 354, 356, 358 have a common mechanism and operate in the same manner for gripping the wire 20 though they are mounted in different directions, the first grip unit 352 will be described below by way of example.

The transportation vehicle 300 moves in the direction indicated by the arrow X1 while the first gripping unit 352 is gripping the wire 20 (the state shown in FIG. 17A). At this time, however, the cam releaser 378 of the cam 360 and the cam releaser 380 of the cam 362 are not yet in contact with the wire grip release plates 128a, 128b.

When the transportation vehicle 300 further moves in the direction indicated by the arrow X1, the cam releasers 378, 380 are brought into contact with the wire grip release plates 128a, 128b (the state shown in FIG. 17B). At this time, the cam releasers 378, 380 relatively slide on the slanted surfaces of the distal ends of the wire grip release plates 128a, 128b. Simultaneously, the cam 360 fixed to the cam releaser 378 rotates in the direction indicated by the arrow X4 about the rotatable shaft 370, and the cam 362 fixed to the cam releaser 380 rotates in the direction indicated by the arrow X4 about the rotatable shaft 372 (see FIG. 16). That is, as the transportation vehicle 300 moves in the direction indicated by the arrow X1, the cams 360, 362 are spaced away from each other, releasing the wire 20.

Upon continued movement of the transportation vehicle 300 in the direction indicated by the arrow X1, the cam releasers 378, 380 relatively move past the tapered ends 126a, 126b of the wire grip release plates 128a, 128b, and thereafter arrive at the main bodies of the wire grip release plates 128a, 128b (the state shown in FIG. 17C). At this time, the gap between the cams 360, 362 is increased to the maximum value (corresponding to L10), and remains constant as long as the cam releasers 378, 380 are kept in contact with the wire grip release plates 128a, 128b. The maximum gap L10 is wider than the width L11 of the pulley 118, and hence does not obstruct the passage of the pulley 118 therethrough.

Operation and advantages of the workpiece feeding apparatus at the time the small workpiece W1 and the large workpiece W2 are to be placed on the workpiece placement plates 326a, 326b of the transportation vehicle 300 will be described below with reference to FIGS. 18 through 23.

Figure 18:
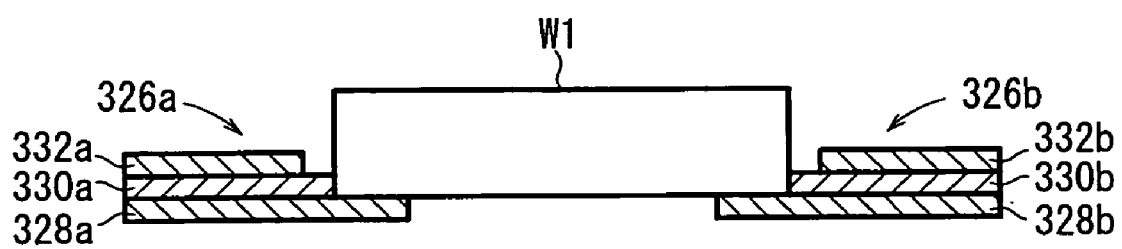
FIG. 18 is a vertical cross-sectional view illustrative of the manner in which a small workpiece is placed on the workpiece placement plate shown in FIG. 12.

First, operation of the workpiece feeding apparatus for placing the small workpiece W1 on the workpiece placement plates 326a, 326b will be described below. As shown in FIG. 18, the workpiece W1 passes vertically through the third plates 332a, 332b and the second plates 330a, 330b without suffering interference therewith. However, the workpiece W1 does not drop off as it is placed on the lowest first plates 328a, 328b. Because the second plates 330a, 330b are cut out along the profile of the workpiece W1, they effectively hold the workpiece W1 to prevent the workpiece W1 from being positionally displaced.

Figure 19:
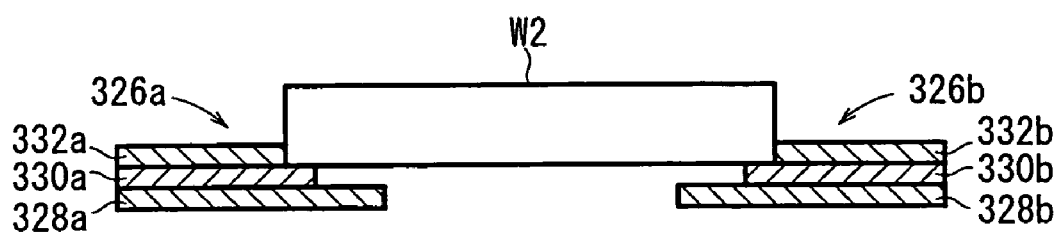
FIG. 19 is a vertical cross-sectional view illustrative of the manner in which a large workpiece is placed on the workpiece placement plate shown in FIG. 12.

Then, operation of the workpiece feeding apparatus for placing the large workpiece W2 on the workpiece placement plates 326a, 326b will be described below. As shown in FIG. 19, the workpiece W2 passes vertically through the third plates 332a, 332b without suffering interference therewith. The workpiece W2 is placed on the second plates 330a, 330b, and does not drop off. Because the third plates 332a, 332b are cut out along the profile of the workpiece W2, they effectively hold the workpiece W2 to prevent the workpiece W2 from being positionally displaced.

Figure 20:
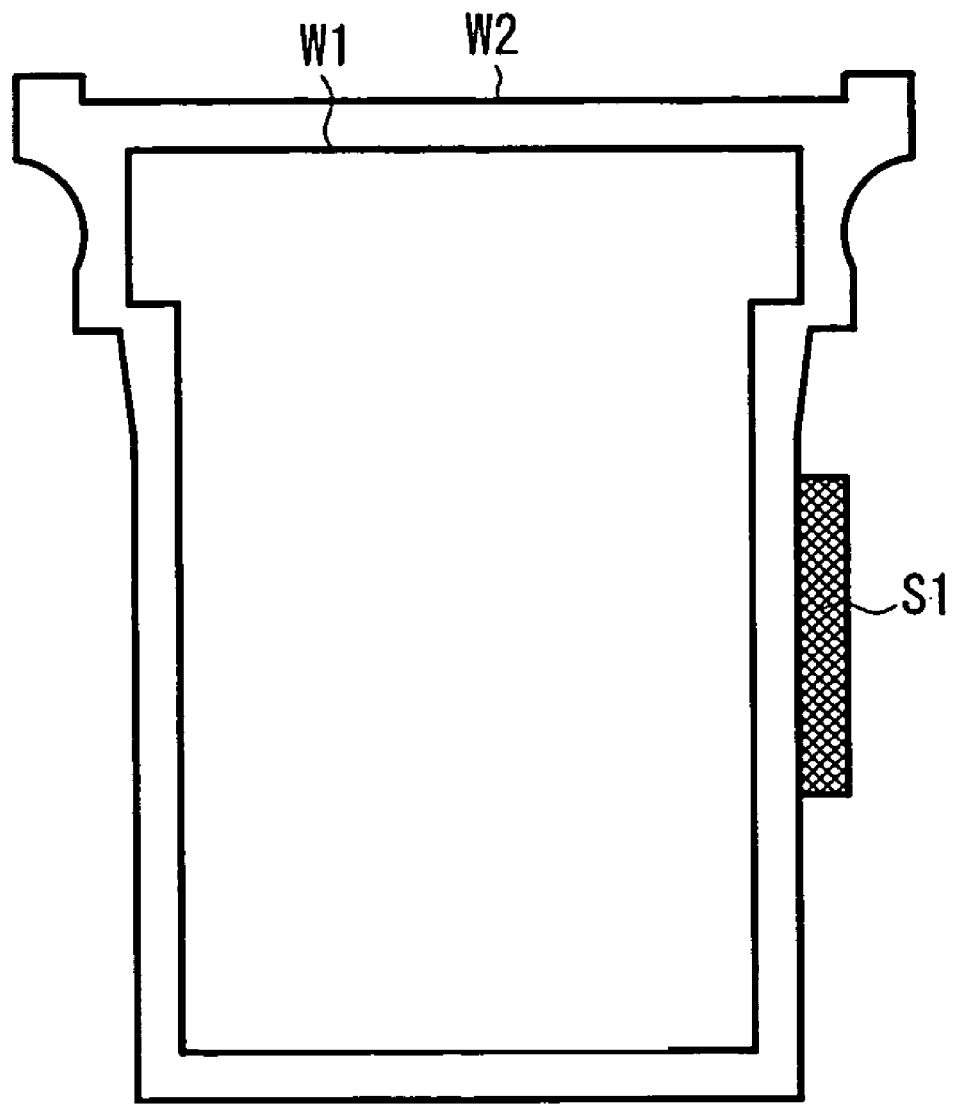
FIG. 20 is a plan view showing an interference region created between the small workpiece and the large workpiece.
Figure 21:
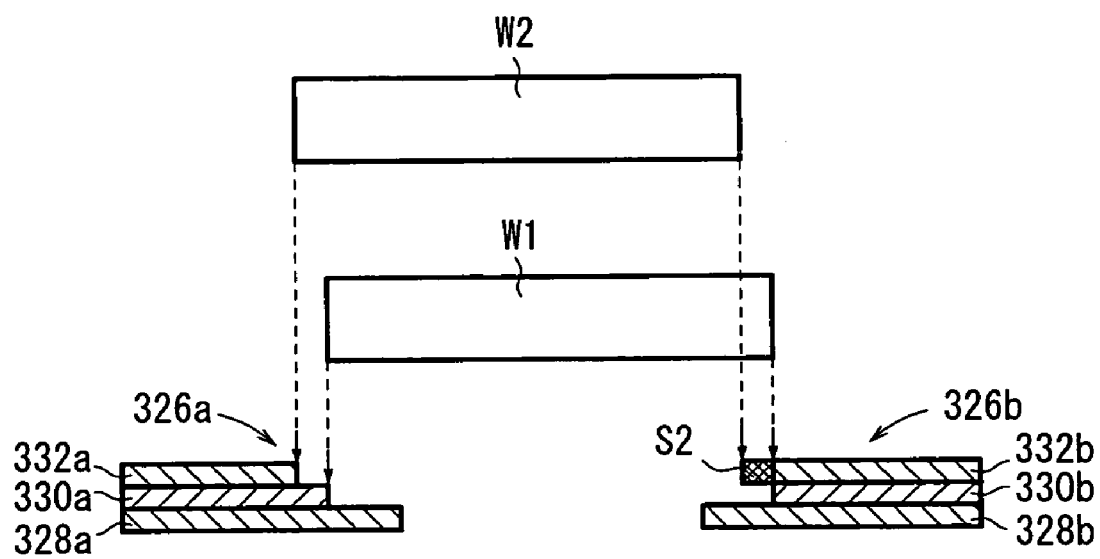
FIG. 21 is a vertical cross-sectional view illustrative of the manner in which a workpiece is placed after the interference region shown in FIG. 20 is removed.

As shown in FIG. 20, if there is an interference region S1 created between the workpiece W1 and the workpiece W2, then the workpiece W1 can easily pass vertically through the third plates 332a, 332b without suffering interference therewith, by removing a region S2 corresponding to the interference region S1 from the teeth 614 of the third plates 332a, 332b to provide a corresponding a space area (third space area), as shown in FIG. 21. The workpiece W1 is placed on the first plates 328a, 328b and positioned by the second plates 330a, 330b. If the interference region S1 is of a small area, then the region S2 corresponding to the interference region S1 in the third plates 332a, 332b is also of a small area. Therefore, the effect that the third plates 332a, 332b have on the positioning of the workpiece W2 is negligibly small.

In the above description, the workpiece placement plates 326a, 326b are designed to handle two differently shaped types of workpieces (W1, W2). However, the workpiece placement plates 326a, 326b are not limited to those two workpieces, but may be designed to handle three or more types of workpieces by increasing the number of plates used.

Figure 22:
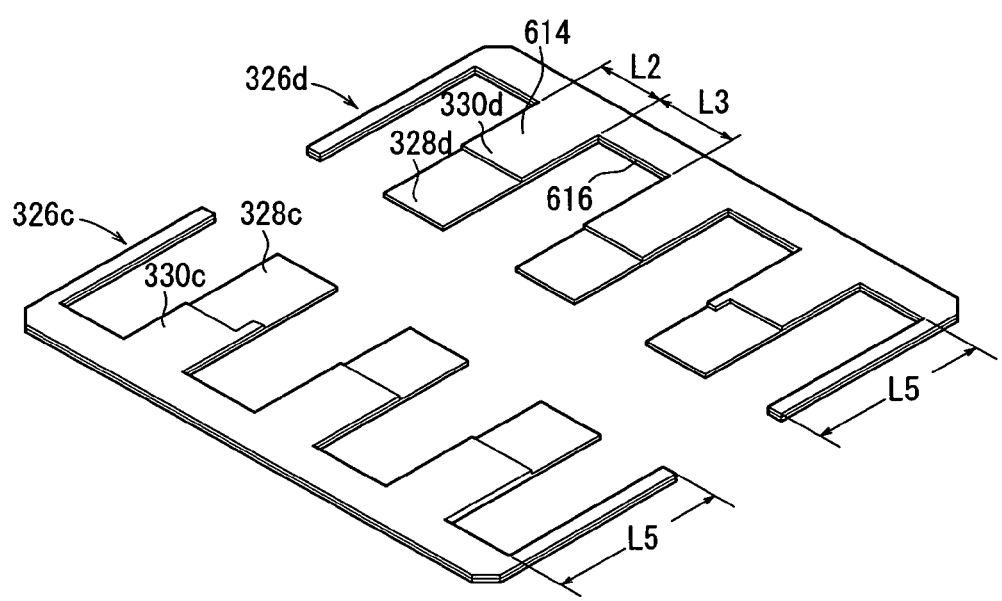
FIG. 22 is a schematic perspective view of a workpiece placement plate having another structure.

The workpiece placement plates 326a, 326b may comprise workpiece placement plates 326c, 326d, as shown in FIG. 22. The workpiece placement plates 326c, 326d comprise respective first plates 328c, 328d (drop prevention plates) and respective second plates 330c, 330d (positioning plates) positioned respectively on the first plates 328c, 328d.

The first plates 328c, 328d are identical in structure to the first plates 328a, 328b of the workpiece placement plates 326a, 326b, and serve the purpose of preventing workpieces from dropping off.

Figure 23:
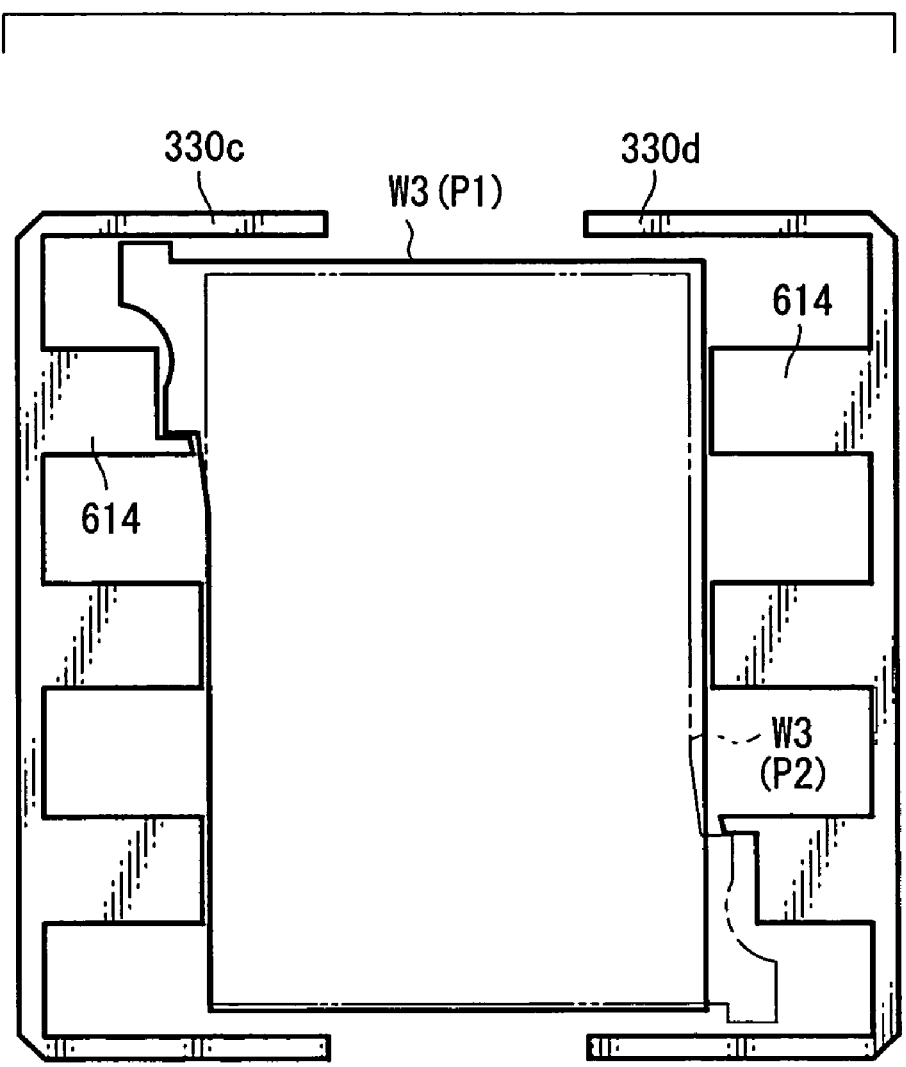
FIG. 23 is a plan view of the structure of a second plate incorporated in the workpiece placement plate shown in FIG. 22.

As shown in FIG. 23, the second plates 330c, 330d have their teeth 614 cut out along the profile of a workpiece W3 placed in a posture P1 and also along the profile of the workpiece W3 placed in a posture P2 that is 180° angularly displaced from the posture P1, providing a corresponding space area.

Therefore, when the workpiece W3 is placed in either the posture P1 or the posture P2 on the workpiece placement plates 326a, 326b, the workpiece W3 can pass vertically through the second plates 330c, 330d without suffering interference therewith. The workpiece W3 is positioned by the second plates 330c, 330d, and prevented from dropping off by the first plates 328c, 328d.

In the above description, the posture P2 is 180° angularly displaced from the posture P1. However, the posture P2 is not limited to the posture that is 180° angularly displaced from the posture P1, but may be any posture with respect to the posture P1, and the space area provided by the workpiece placement plates 326c, 326d may be changed in shape accordingly.

The workpiece placement plates 326a, 326b and the workpiece placement plates 326c, 326d may be combined with each other. With this arrangement, a plurality of workpieces having different shapes can be transported reliably in respective desired positions or postures.

The above structural details of the workpiece placement plates 326a, 326b and/or the workpiece placement plates 326c, 326d may be applied to the placement surfaces 458, 460 of the lifting/lowering apparatus 400. Such modifications allow workpieces to be processed easily and reliably in the workpiece processing station 800.

Figure 24A:
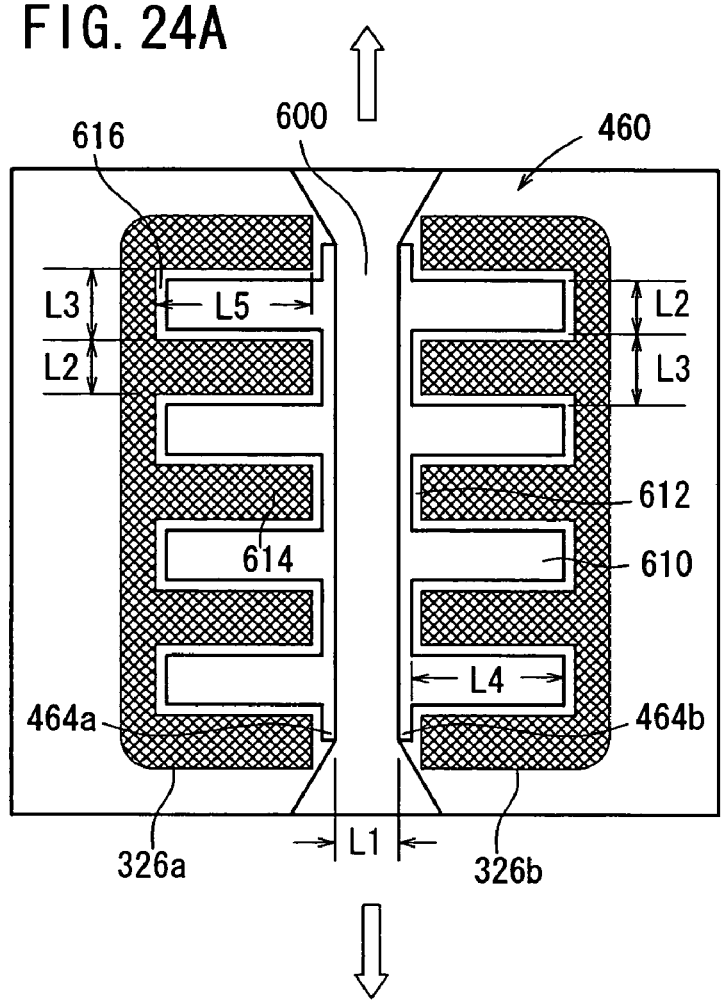
FIG. 24A is a schematic plan view of the structure of a second placement plate of the lifting/lowering apparatus and the workpiece placement plate of the transportation vehicle.
Figure 24B:
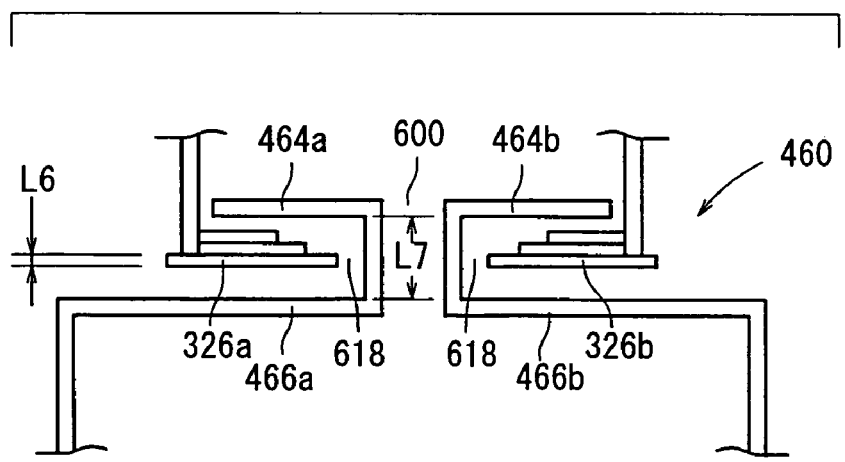
FIG. 24B is a schematic front elevational view of the structure of the second placement plate of the lifting/lowering apparatus and the workpiece placement plate of the transportation vehicle.

Structural details of the second placement surface 460 of the lifting/lowering apparatus 400 and the workpiece placement plates 326a, 326b of the transportation vehicle 300 and operation for transferring a workpiece will be described below with reference to FIGS. 24A and 24B. FIG. 24A is a plan view of the structure of the second placement surface 460 and the workpiece placement plates 326a, 326b as they are placed in a horizontal plane, and FIG. 24B is a front elevational view thereof. Since the first placement surface 458 and the second placement surface 460 are identical in shape to each other, the second placement surface 460 will be described below.

In FIG. 24A, the arrows represent the directions in which the transportation vehicle 300 moves, and the reference character 600 represents a gap, or a passage, between the first and second placement members 464a, 464b. The plate 320 of the transportation vehicle 300 passes through the gap (the passage 600). The passage 600 has a width L1 greater than the width of the plate 320. The first and second placement members 464a, 464b have teeth 610 each having a width L2 and recesses 612 each having a width L3, the teeth 610 and the recesses 612 being aligned with each other. The workpiece placement plates 326a, 326b also have teeth 614 each having a width L2 and recesses 616 each having a width L3, the teeth 614 and the recesses 616 being aligned with each other. The widths L2, L3 are related to each other as L3>L2. The teeth 610 of the first and second placement members 464a, 464b have a longitudinal length L4, and the recesses 616 in the workpiece placement plates 326a, 326b have a longitudinal length L5, the lengths L4, L5 being related to each other as L5>L4.

When the recesses 612 in the first and second placement members 464a, 464b, the teeth 614 of the workpiece placement plates 326a, 326b, the teeth 610 of the first and second placement members 464a, 464b, and the recesses 616 in the workpiece placement plates 326a, 326b are positioned in superposed relation, because the relationships L3>L2 and L5>L4, one set of teeth (e.g., the teeth 610 of the first placement member 464a can pass through another set of recesses (e.g., the recesses 616 in the workpiece placement plates 326a, 326b).

As shown in FIG. 24B, the first plate 466a and the first placement member 464a, and the second plate 466b and the second placement member 464b are spaced from each other by a distance (L7), providing a space 618 therebetween. The space 618 has a gap L7 that is greater than the thickness L6 of the workpiece placement plates 326a, 326b. Stated otherwise, according to the present embodiment, a workpiece is transferred based on the fact that the second placement surface 460 and the workpiece placement plates 326a, 326b pass through each other without causing interference.

Figure 25B:
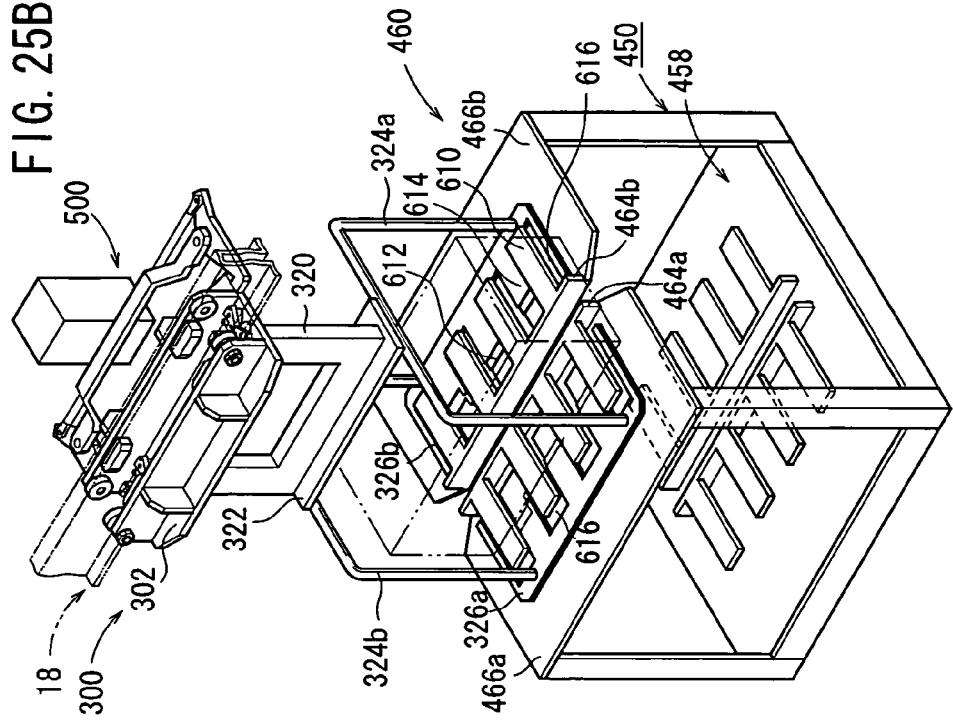
FIGS. 25A and 25B are perspective views illustrative of the manner in which a workpiece is transferred between the lifting/lowering apparatus and the transportation vehicle.

A specific example of a process for transferring a workpiece placed on the workpiece placement plates 326a, 326b to the second placement surface 460 will be described below with reference to FIGS. 25A and 25B. Since the second placement surface 460 and the first placement surface 458 are structurally identical to each other, the second placement surface 460 will be described below by way of example.

Figure 25A:
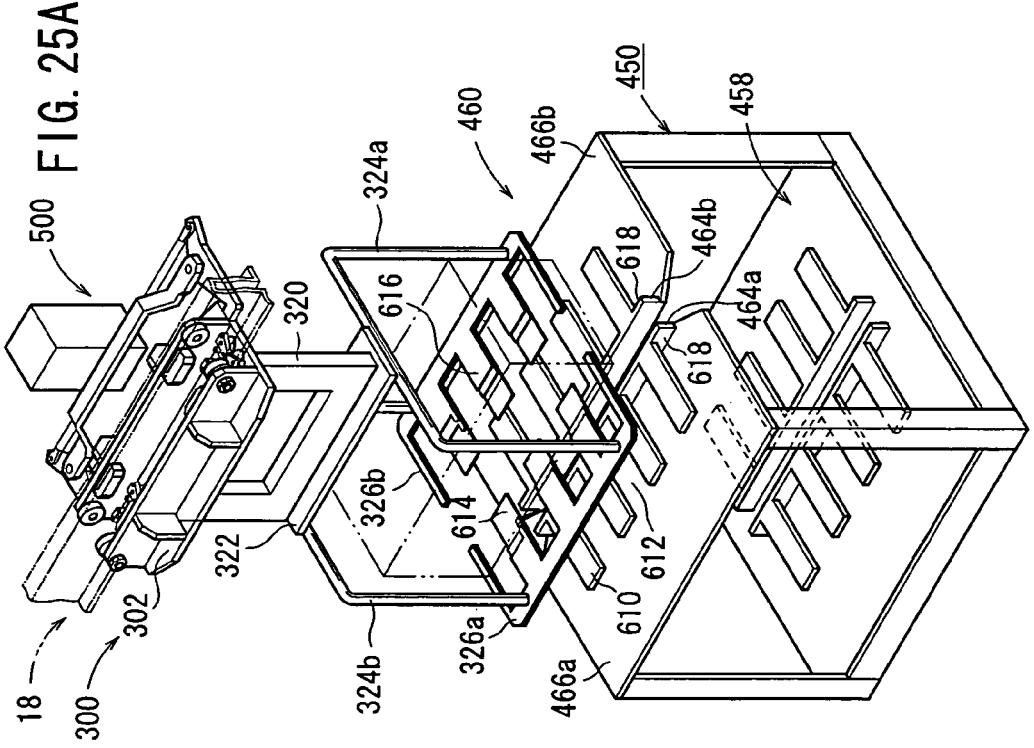
Figure 28:
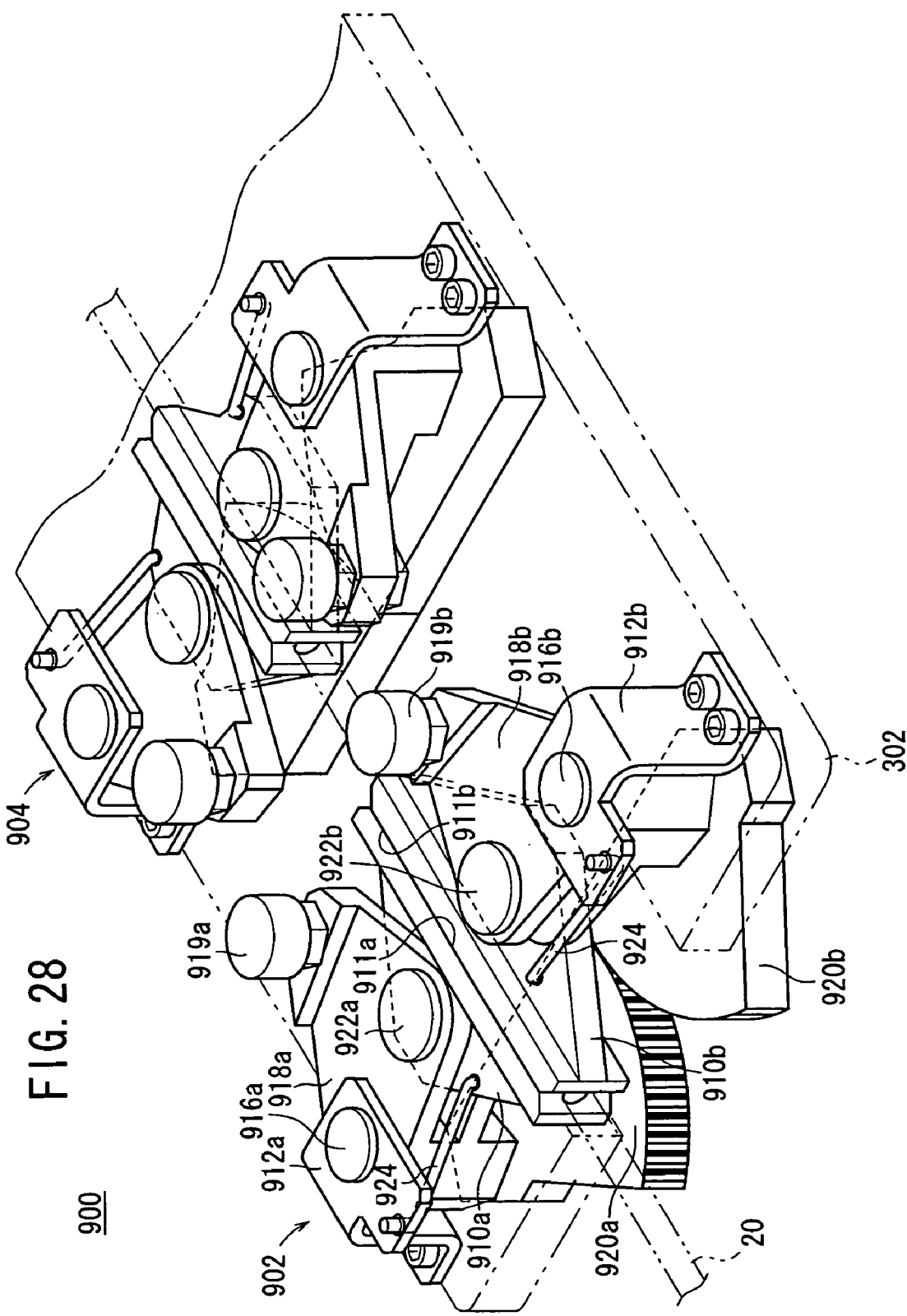
FIG. 28 is a perspective view of the main structure of a wire gripping mechanism according to another embodiment of the present invention.

FIG. 25A shows a state in which the workpiece placement plates 326a, 326b holds a workpiece and reaches a position above the second placement surface 460. It is assumed that at this time the workpiece placement plates 326a, 326b are fixed by the fixing device 500, and as shown in FIGS. 24A and 24B, the teeth 610 of the second placement surface 460 and the recesses 616 in the workpiece placement plates 326a, 326b, and the recesses 612 in the second placement surface 460 and the teeth 614 of the workpiece placement plates 326a, 326b are positioned in superposed relation. At this time, the workpiece placement plates 326a, 326b have not yet entered the space 618.

When the second placement surface 460 is further lifted, the teeth 614 pass through the recesses 612 (see FIGS. 24A and 24B), the workpiece placement plates 326a, 326b enter the space 618, the second placement surface 460 ascends above the workpiece placement plates 326a, 326b, and the workpiece placed on the workpiece placement plates 326a, 326b is released from the workpiece placement plates 326a, 326b and transferred to the second placement surface 460. This state is shown in FIG. 25B.

A process for transferring a workpiece from the second placement surface 460 to the workpiece placement plates 326a, 326b will be described below. The lifting/lowering apparatus 400 elevates the second placement surface 460 with a workpiece placed thereon to a position slightly above the workpiece placement plates 326a, 326b, and keeps the second placement surface 460 in that position. The transportation vehicle 300 then reaches the position. At this time, since the second placement surface 460 waits in the position slightly above the workpiece placement plates 326a, 326b, the workpiece placement plates 326a, 326b enter the space 618. Then, the second placement surface 460 is slightly lowered, whereupon the teeth 614 pass through the recesses 612 and the workpiece placement plates 326a, 326b move out of the space 618, receiving the workpiece from the second placement surface 460 (see FIGS. 24A and 24B).

A procedure for transferring a workpiece from the transportation vehicle 300 to a working block (and a procedure for transferring a workpiece from a working block to the transportation vehicle 300) will be described below with reference to FIGS. 26A through 26E.

In FIGS. 26A through 26E, a fixed point Z1 represents the height of the workpiece placement plates 326a, 326b of the transportation vehicle 300. Since the transportation vehicle 300 itself does not move vertically, the fixed point Z1, i.e., the height of the workpiece placement plates 326a, 326b, is constant. The fixed point Z1 serves as a transfer position for transferring a workpiece from the transportation vehicle 300 to the placement table 450 of the lifting/lowering apparatus 400 (or a transfer position for transferring a workpiece from the placement table 450 to the transportation vehicle 300). A fixed point Z2 represents the height of a working surface of the working block. Since the working block itself does not move vertically, the fixed point Z2, i.e., the height of the working surface, is constant. The fixed point Z2 serves as a transfer position for transferring a workpiece from the placement table 450 to the working block (or a transfer position for transferring a workpiece from the working block to the placement table 450). A workpiece is received from the fixed position Z1 or the fixed position Z2 and transferred thereto when the lifting/lowering apparatus 400 lifts and lowers the placement table 450.

The reference character 650 represents a workpiece which has not yet been processed by the working block (hereinafter referred to as "unprocessed workpiece"), and the reference character 652 represents a workpiece which has been processed by the working block (hereinafter referred to as "processed workpiece"). According to a basic work flow, the working block receives the unprocessed workpiece 650 from a preceding process, processes the unprocessed workpiece 650 into the processed workpiece 652, and transfers the processed workpiece 652 to a next process (not shown).

For receiving the unprocessed workpiece 650 carried from the preceding process, the lifting/lowering apparatus 400 lifts the placement table 450 and stops the placement table 450 when the first placement surface 458 reaches a position slightly below the fixed point Z1. Then, the transportation vehicle 300 with the unprocessed workpiece 650 placed thereon moves from the preceding process to the transfer position of the lifting/lowering apparatus 400 in the working block, and is temporarily positioned and fixed by the fixing device 500. It is assumed that at this time the teeth 610 of the first placement surface 458 and the recesses 616 in the workpiece placement plates 326a, 326b, and the recesses 612 in the first placement surface 458 and the teeth 614 of the workpiece placement plates 326a, 326b are positioned in superposed relation. The processed workpiece 652 waits in the working block (the state shown in FIG. 26A).

When the placement table 450 is slightly elevated, as described above with reference to FIGS. 24A and 24B, the teeth 614 pass through the recesses 612, the workpiece placement plates 326a, 326b enter the space 618 in the first placement surface 458, the first placement surface 458 ascends above the workpiece placement plates 326a, 326b, and the unprocessed workpiece 650 placed on the workpiece placement plates 326a, 326b is released from the workpiece placement plates 326a, 326b and transferred to the first placement surface 458.

Then, the transportation vehicle 300 which has become empty by transferring the unprocessed workpiece 650 to the first placement surface 458 moves to another working block. The lifting/lowering apparatus 400 lowers the placement table 450 with the unprocessed workpiece 650 placed on the first placement surface 458, and stops the placement table 450 when the second placement surface 460 reaches the fixed point Z2 (the state shown in FIG. 26B).

Then, the processed workpiece 652 waiting in the working block is moved to the second placement surface 460 (the state shown in FIG. 26C). The lifting/lowering apparatus 400 lifts the placement table 450, and stops the placement table 450 when the first placement surface 458 reaches the fixed point Z2 (not shown).

The unprocessed workpiece 650 placed on the first placement surface 458 is transferred to the working block. The lifting/lowering apparatus 400 lifts the placement table 450 with the processed workpiece 652 placed on the second placement surface 460, and stops the placement table 450 when the second placement surface 460 reaches a position slightly higher than the fixed point Z1. In order to transfer the processed workpiece 652 to a next process, the transportation vehicle 300 with the workpiece placement plates 326a, 326b which are empty moves from another working block. The transportation vehicle 300 reaches the transfer position of the lifting/lowering apparatus 400 in the working block (the state shown in FIG. 26D), and is temporarily positioned and fixed by the fixing device 500. It is assumed that at this time the teeth 610 of the second placement surface 460 and the recesses 616 in the workpiece placement plates 326a, 326b, and the recesses 612 in the second placement surface 460 and the teeth 614 of the workpiece placement plates 326a, 326b are positioned in superposed relation.

Since the second placement surface 460 waits in a position slightly above the workpiece placement plates 326a, 326b, the workpiece placement plates 326a, 326b enter the space 618. When the second placement surface 460 is slightly lowered, as described above with reference to FIGS. 24A and 24B, the teeth 614 pass through the recesses 612 and the workpiece placement plates 326a, 326b move out of the space 618, releasing the processed workpiece 652 placed on the second placement surface 460 from the second placement surface 460 and transferring the processed workpiece 652 to the workpiece placement plates 326a, 326b.

The transportation vehicle 300 moves from that position to the next process for supplying the processed workpiece 652 received from the second placement surface 460 to the next process. To prepare for a next process, the lifting/lowering apparatus 400 lifts the placement table 450 and stops the placement table 450 when the first placement surface 458 reaches a position slightly below the fixed point Z1 (the state shown in FIG. 26E).

In FIGS. 26A through 26E, the unprocessed workpiece 650 is shown as being transferred to the first placement surface 458 of the placement table 450, and the processed workpiece 652 is shown as being transferred to the second placement surface 460 of the placement table 450. However, the process of transferring a workpiece according to the present embodiment is not limited to such a combination. For example, if the processed workpiece 652 is placed in advance on the first placement surface 458 of the placement table 450, since the second placement surface 460 is empty, the transportation vehicle 300 can transfer the unprocessed workpiece 650 to the second placement surface 460. Furthermore, after having transferred the unprocessed workpiece 650 placed on the second placement surface 460 to the working block with the lifting/lowering apparatus 400, the transportation vehicle 300 can receive the processed workpiece 652 placed on the first placement surface 458, and transfer the processed workpiece 652 to another working block. In this manner, the freedom of the transferring process is further increased.

A process of branching the transportation vehicle 300 with the branched transporting mechanism 100 will be described below.

When the transportation vehicle 300 moves on the rail 18 toward the branched transporting mechanism 100 and reaches the end of the rail 18 in FIG. 1, the wire grip release plates 128a, 128b fixed to the reverse surfaces of the guide plates 124a, 124b cause the wire gripping mechanism 350 fixedly mounted on the transportation vehicle 300 to release the wire 20.

Specifically, in FIG. 7, the cam releasers 378, 380 of the first grip unit 352 are turned by abutment against the wire grip release plates 128a, 128b, releasing the first grip unit 352 from the wire 20 as a source wire. At this time, the second grip unit 354 and the fourth grip unit 358 are in the unclamping state. However, since the third grip unit 356 is in the clamping state in which it clamps the wire 20 as the source wire, the transportation vehicle 300 is transported to the turn plate 254 of the branched transporting mechanism 100.

The rotating mechanism 200 energizes the motor 212 to rotate at the time a position detecting sensor (not shown) detects that the head of the transportation vehicle 300 reaches the driven roller 210 or the drive roller 216. Upon rotation of the motor 212, the gear train 214 rotates the drive roller 216 and the driven roller 210, transferring the transportation vehicle 300 onto the turn plate 254.

Thereafter, the cam releasers 378, 380 of the third grip unit 356 of the transportation vehicle 300 reach the wire grip release plates 128a, 128b, and the wire grip release plates 128a, 128b turn the cam releasers 378, 380 to release the wire 20. The transportation vehicle 300 is now completely released from the driving action of the wire 20 as the source wire.

The driven rollers 222, 224 urge the transportation vehicle 300 toward the drive roller 216 under the resiliency of the coil springs 242, 244, preventing the transportation vehicle 300 from being dislodged.

Upon further rotation of the motor 212, the transportation vehicle 300 is released from the rail 18 as a source rail, and transferred onto the turn plate 254. The completion of the transfer of the transportation vehicle 300 onto the turn plate 254 is detected by a position detecting sensor (not shown). When the transfer is completed, the motor 212 is de-energized (the state shown in FIG. 4). The rotating mechanism 200 is rotated 360° about the shaft 110 by the rotation of the motor 106.

A process of feeding the transportation vehicle 300 on the turn plate 254 to the rail 18 as a destination rail will be described below. As described above, after the turn plate 254 with the transportation vehicle 300 placed thereon is aligned straight with the rail 18 as the destination rail, the motor 212 is energized to push the transportation vehicle 300 toward the rail 18 as the destination rail. The rollers 312a, 312b, 314a, 314b of the transportation vehicle 300 roll onto the rail 18 as the destination rail, and the wire gripping mechanism 350 of the transportation vehicle 300 grips the wire 20 as the destination wire.

Specifically, after the cam releasers 378, 380 of the first grip unit 352 of the transportation vehicle 300 are spread by the wire grip release plates 128a, 128b, the cam releasers 378, 380 return to their original position, gripping the wire 20 as the destination wire. At this time, since the first grip unit 352 of the transportation vehicle 300 grips the wire 20 as the destination wire, the transportation vehicle 300 is pulled by the driving action of the wire 20 as the destination wire, and pushed by the rotation of the drive roller 216 and the driven roller 210.

As the transportation vehicle 300 is further moved, the third grip unit 356 thereof is spread by the wire grip release plates 128a, 128b, and then returns to its original position, gripping the wire 20 as the destination wire.

Therefore, the transportation vehicle 300 is driven by the wire 20 as the destination wire, and is released from the turn plate 254. The branching process carried out by the branched transporting mechanism 100 is now ended.

FIGS. 27A through 27D are views showing successive stages of a procedure for the branched transporting mechanism to branch the direction of the transportation vehicle 300. It is assumed that a source rail (a rail on which the transportation vehicle 300 is presently traveling) is represented by E, and destination rails (rails on which the transportation vehicle 300 is about to travel next) are represented by F, G, H. The destination rail F is a rail that extends perpendicularly to the right as viewed from the source rail E. The destination rail G is a rail that extends perpendicularly to the left as viewed from the source rail E. The destination rail H is a rail that is aligned straight with the direction in which the transportation vehicle 300 travels, as viewed from the source rail E. The process of branching the transportation vehicle 300 with the branched transporting mechanism 100 will be described below with respect to an example in which the transportation vehicle 300 turns to the right from the source rail E to the destination rail F.

The transportation vehicle 300 travels on the source rail E toward the turn plate 254 (the state shown in FIG. 27A). Then, the transportation vehicle 300 is pulled onto the turn plate 254 (the state shown in FIG. 27B). The transportation vehicle 300 is pulled by the process described above (see FIG. 4). Then, the turn plate 254 onto which the transportation vehicle 300 has been transferred is turned to the right (the state shown in FIG. 27C). When the turn plate 254 is aligned straight with the destination rail F, the turn plate 254 stops its turning movement. Then, the transportation vehicle 300 on the turn plate 254 is delivered onto the destination rail F. The transportation vehicle 300 is delivered by the process described above (see FIG. 4). In this manner, the transportation vehicle 300 is driven on the destination rail F, and is released from the turn plate 254 (the state shown in FIG. 27D).

Figure 29:
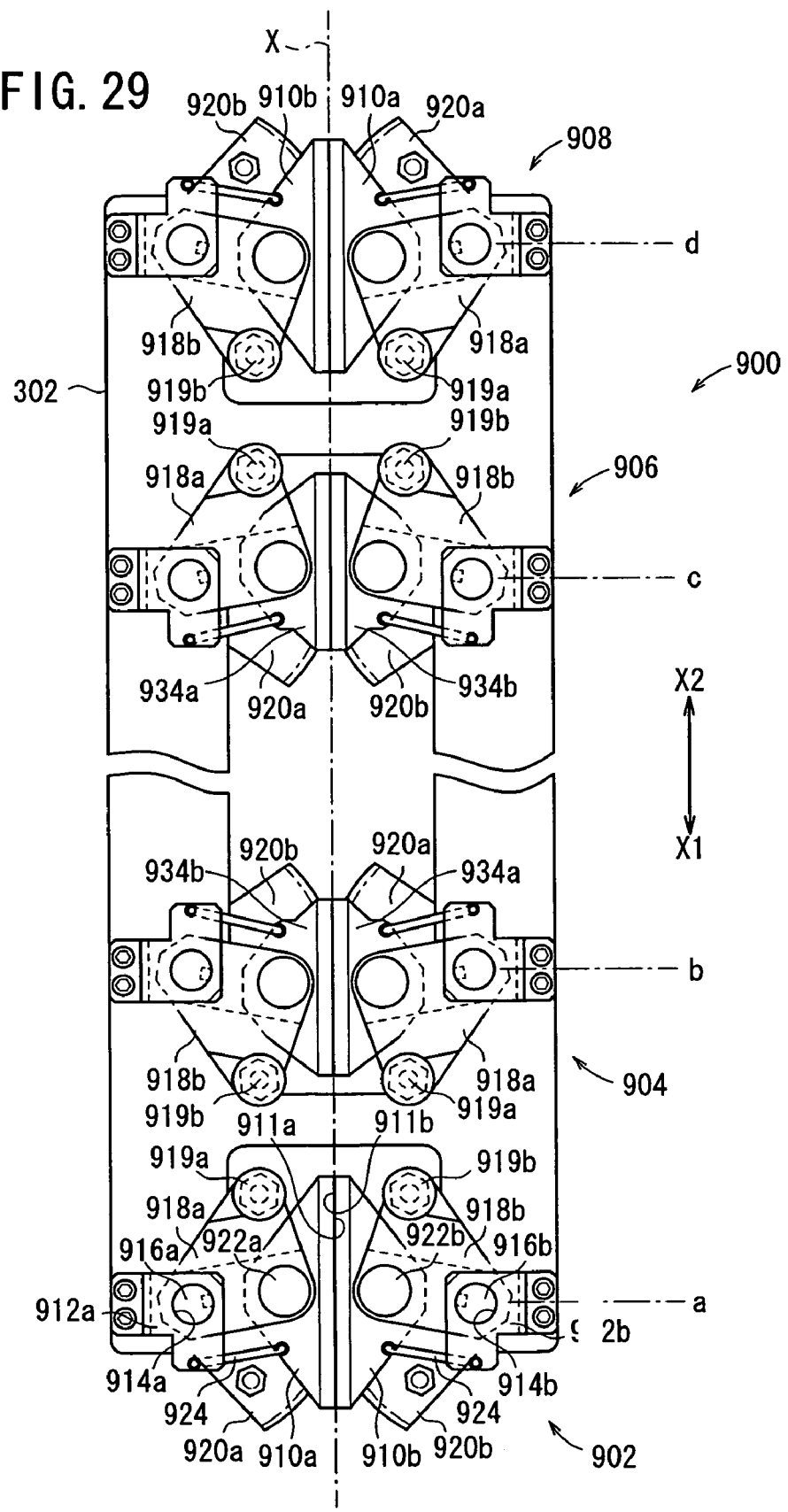
FIG. 29 is a fragmentary plan view of the structure of the wire gripping mechanism according to the other embodiment of the present invention.

FIGS. 28 through 31 show a wire gripping mechanism 900 according to another embodiment of the present invention. As shown in FIG. 29, the wire gripping mechanism 900 comprises a first grip unit 902, a second grip unit 904, a third grip unit 906, and a fourth grip unit 908 which are disposed at respective positions a, b, c, d on the upper surface of the support base 302 of the transportation vehicle 300. A line X represents a central line of the wire gripping mechanism 900 and also a center of movement of the wire 20 to be gripped. The wire 20 can be moved in opposite directions on the line X (the directions indicated by the arrows X1, X2).

Since the first through fourth grip units 902, 904, 906, 908 have a common mechanism for gripping or releasing the wire 20 though they have slightly different structures or are mounted in slightly different directions, the first grip unit 902 will be described below.

Figure 30:
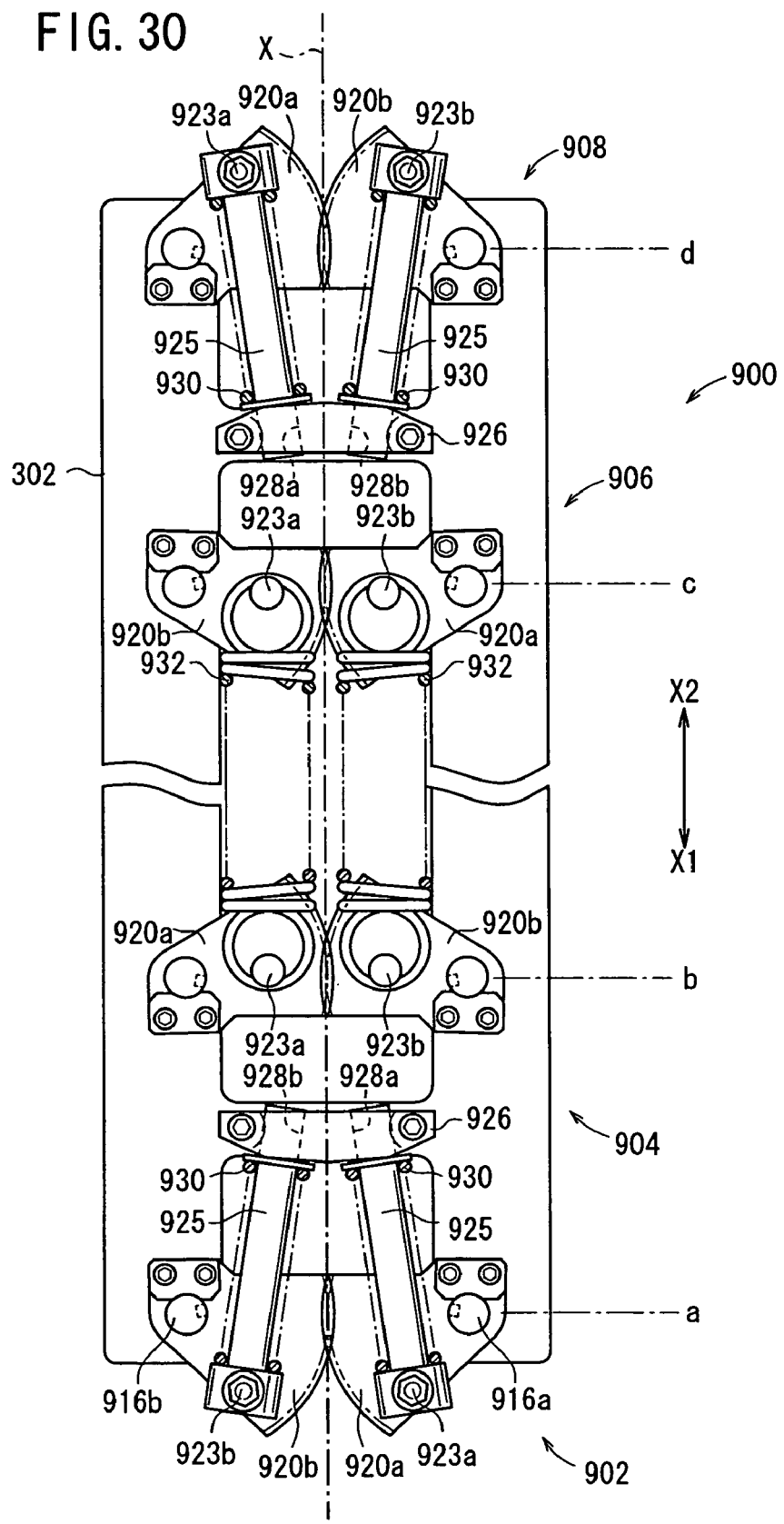
FIG. 30 is a fragmentary bottom view of the structure of the wire gripping mechanism according to the other embodiment of the present invention.

As shown in FIGS. 28 through 31 (the parts are shown laterally reversed in FIG. 30 as FIG. 30 is a bottom view), the first grip unit 902 has identical parts disposed laterally symmetrically. In FIGS. 28 through 31, the parts on one side are represented by reference characters with a suffix "a", and the parts on the other side are represented by reference characters with a suffix "b". Those parts whose reference characters have no suffix are common parts on both sides.

The parts on one side of the first grip unit 902 will be described below, and the parts on the other side of the first grip unit 902 will not be described below.

The first grip unit 902 has a support member 912a mounted on an end of the position a on the support base 302. The support member 912a has a shaft hole 914a defined therein, and the support base 302 has a through hole (not shown) defined therein at the position aligned with the shaft hole 914a, the through hole having the same diameter as the shaft hole 914a. A shaft 916a is rotatably inserted in the shaft hole 914a and the through hole. A rotational member 918a which is triangular as viewed in plan is fixed to the shaft 916a over the surface of the support base 302, and a sectorial gear 920a is fixed to the shaft 916a beneath the reverse surface of the support base 302.

A shaft 922a is fixed to the rotational member 918a in a predetermined region thereof, and a grip member 910a is rotatably supported on the shaft 922a. The grip member 910a has a grip surface 911a for gripping the wire 20 over a predetermined range. A cylindrical grip releaser 919a (wire grip release means) projecting upwardly is fixedly mounted on the surface of the rotational member 918a in a predetermined region thereof.

The grip member 910a and the support member 912a are coupled to each other by a link 924. Specifically, the link 924 has an end engaging the support member 912a and another end engaging the grip member 910a near an end thereof. The link 924 has a length equal to the distance between the center of the shaft 916a and the center of the shaft 922a. The rotational member 918a and the link 924 jointly make up a parallel crank mechanism. Therefore, the grip surface 911a of the grip member 910a that is coupled to the rotational member 918a and the link 924 is kept parallel to the wire 20 at all times.

Figure 31:
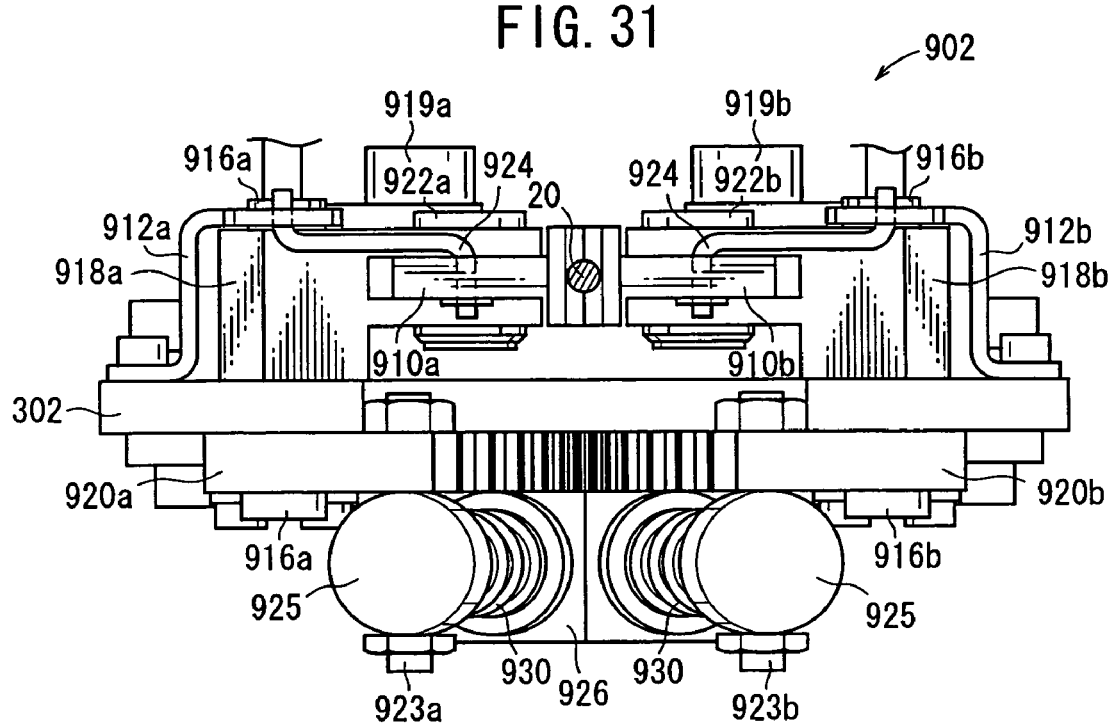
FIG. 31 is a schematic front elevational view of the structure of the wire gripping mechanism according to the other embodiment of the present invention.

As shown in FIGS. 30 and 31 (the parts are shown laterally reversed in FIG. 30 as FIG. 30 is a bottom view), a downwardly (upwardly in FIG. 30) projecting pin 923a is mounted on the gear 920a in a predetermined region thereof. A bar 925 has an end rotatably mounted on the pin 923a and another end slidably inserted in a hole 928a that is defined in a step 926 disposed on the reverse surface of the support base 302. A coil spring 930 (urging means) is disposed around the bar 925 and interposed between the pin 923a and the step 926.

The first grip unit 902 comprises the parts thus arranged on one side (which are represented by the reference characters with a suffix "a") and the parts on the right side of the line X (which are represented by the reference characters with a suffix "b") that are in symmetrical relation to those parts on one side. In the first grip unit 902, the gears 920a, 920b have the same number of teeth, and serve as synchronizing gears for equalizing the distance between the wire 20 and the grip surface 911a and the distance between the wire 20 and the grip surface 911b to each other at all times.

The fourth grip unit 908 is structurally identical to the first grip unit 902, and different therefrom as to the position and direction in which it is mounted. Specifically, the fourth grip unit 908 is disposed in the position d on the support base 302 and angularly turned 180° from the first grip unit 902.

The second grip unit 904 and the third grip unit 906 are slightly different in structure from the first grip unit 902 as to the following two points: The first point is that, as shown in FIG. 29, grip members 934a, 934b of the second grip unit 904 and the third grip unit 906 are slightly smaller in dimensions than the grip members 910a, 910b of the first grip unit 902 and the fourth grip unit 908. The second point is that, as shown in FIG. 30, no bars 925 are mounted on pins 923a, 923b of gears 920a, 920b of the second grip unit 904 and the third grip unit 906, and coil springs 932 (urging means) for pulling the pins 923a, 923b are interposed between the pin 923a of the second grip unit 904 and the pin 923b of the third grip unit 906 and between the pin 923b of the second grip unit 904 and the pin 923a of the third grip unit 906. The above differences are caused by dimensional limitations of the wire gripping mechanism 900. There is no difference as to a main process to grip the wire 20 between the first through fourth grip units 902, 904, 906, 908.

Operation and advantages of the wire gripping mechanism 900 will be described below. A process of the wire gripping mechanism 900 to grip the wire 20 will be described below with reference to FIGS. 29 and 30. When the wire 20 is stopped, the first grip unit 902 and the fourth grip unit 908 grip the wire 20 under the resiliency of the coil springs 930, and the second grip unit 904 and the third grip unit 906 grip the wire 20 under the resiliency of the coil springs 932.

When the wire 20 is moved in the normal direction (the direction indicated by the arrow X1), the first grip unit 902 and the third grip unit 906 reliably clamp the wire 20 because the direction of frictional forces produced on their surfaces which contact the wire 20 and the direction to bring the grip members 910a, 910b or the grip members 934a, 934b closer to each other are the same as each other. However, the second grip unit 904 and the fourth grip unit 908 do not produce sufficient forces to grip the wire 20 (they are substantially in the unclamping state) because the direction of frictional forces produced on their surfaces which contact the wire 20 and the direction to bring the grip members 910a, 910b or the grip members 934a, 934b closer to each other disagree with each other.

When the wire 20 is moved in the reverse direction (the direction indicated by the arrow X2), the second grip unit 904 and the fourth grip unit 908 reliably clamp the wire 20 and the first grip unit 902 and the third grip unit 906 do not produce sufficient forces to grip the wire 20 (they are substantially in the unclamping state), opposite to the situation when the wire 20 is moved in the direction indicated by the arrow X1.

Inasmuch as the mechanisms for gripping the wire 20 (the first through fourth grip units 902, 904, 906, 908) are provided with respect to the respective directions in which the wire 20 rotates (the normal direction and the reverse direction), the wire 20 can be gripped irrespective of the direction in which the wire 20 rotates. However, if the wire 20 rotates in only the normal direction or the reverse direction, then one or more mechanisms for gripping the wire 20 may be provided depending on that direction.

As shown in FIG. 29, the wire gripping mechanism 900 has the third grip unit 906 oriented in the same direction as the first gripping unit 902, disposed in the position c, and the fourth grip unit 908 oriented in the same direction as the second gripping unit 904, disposed in the position d. With this arrangement, it is possible to grip the wire 20 at two positions in each of the rotating directions (the normal direction and the reverse direction), so that the wire 20 can be gripped with increased reliability and the transportation vehicle 300 is stabler in posture when transported.

The first grip unit 902 is taken for example. Since the grip surfaces 911a, 911b grip the wire 20 over a predetermined range, slippage caused when the wire 20 is gripped is effectively suppressed, and the accuracy with which to grip the wire 20 is increased. When the grip members 910a, 910b are moved parallel to the wire 20 and grip the wire 20, the grip surfaces 911a, 911b in their entirety contact the wire 20 at the same time. Therefore, no local stresses are applied to the wire 20, reducing an amount of wear on the wire 20 thereby to increase the durability of the wire 20.

The grip members 910a, 910b are brought closely to and spaced from the wire 20 in synchronism by the gears 920a, 920b having the same number of teeth. Therefore, the grip members 910a, 910b can grip the wire 20 simultaneously at the center of movement thereof, so that the stability of the gripping action on the wire 20 can be increased.

A procedure for releasing the wire 20 from the wire gripping mechanism 900 will be described below with reference to FIGS. 32A through 32C. The wire gripping mechanism 900 releases the wire 20 with the wire grip release plates 128a, 128b of the branched transporting mechanism 100, as with the wire gripping mechanism 350 described above. As described above, since the first through fourth grip units 902, 904, 906, 908 have a common mechanism and operate in the same manner for gripping the wire 20 though they are mounted in different directions, the first grip unit 902 will be described below by way of example.

The transportation vehicle 300 moves in the direction indicated by the arrow X1 while the first gripping unit 352 is gripping the wire 20 (the state shown in FIG. 32A). At this time, however, the grip releasers 919a, 919b of the first grip unit 902 are not yet in contact with the wire grip release plates 128a, 128b.

When the transportation vehicle 300 further moves in the direction indicated by the arrow X1, the grip releasers 919a, 919b are brought into contact with the wire grip release plates 128a, 128b (the state shown in FIG. 32B). At this time, the grip releasers 919a, 919b relatively slide on the slanted surfaces of the distal ends of the wire grip release plates 128a, 128b. Simultaneously, the rotational member 918a integral with the grip releaser 919a rotates in the direction indicated by the arrow X4 about the shaft 916a, and the rotational member 918b integral with the grip releaser 919b rotates in the direction indicated by the arrow X5 about the shaft 916b. That is, as the transportation vehicle 300 moves in the direction indicated by the arrow X1, the grip members 910a, 910b are spaced away from each other, releasing the wire 20.

Upon continued movement of the transportation vehicle 300 in the direction indicated by the arrow X1, the grip releasers 919a, 919b relatively move past the tapered ends 126a, 126b of the wire grip release plates 128a, 128b, and thereafter arrive at the main bodies of the wire grip release plates 128a, 128b (the state shown in FIG. 32C). At this time, the gap between the grip members 910a, 910b becomes maximum (corresponding to L11), and remains constantly as long as the grip releasers 919a, 919b are kept in contact with the wire grip release plates 128a, 128b. The maximum gap L11 is wider than the width L10 of the pulley 118 which rotates the wire 20, and hence does not obstruct the passage of the pulley 118 therethrough.

INDUSTRIAL APPLICABILITY

As described above, the workpiece feeding apparatus according to the present invention can efficiently feed a workpiece to a working block, can easily change the direction in which the workpiece is fed, and can reliably position and feed the workpiece even when the type of the workpiece or the posture in which the workpiece is transported is changed. The workpiece feeding apparatus can thus appropriately be employed in processing the workpiece in a plurality of processes.

The invention claimed is:

1. A workpiece feeding apparatus having a feeding apparatus for feeding a workpiece on a plurality of rails held in an elevated position, said feeding apparatus comprising:
a branched transporting mechanism disposed between said rails which are arranged in a crisscross pattern;
transporting means for moving along said rails; and
a non-self-propelled transportation vehicle for transporting the workpiece by engaging and disengaging said transporting means;
wherein said branched transporting mechanism receives said transportation vehicle transported by said transporting means and a first one of the rails and delivers said transportation vehicle to a second one of the rails, said branched transporting mechanism having a rotating mechanism for rotating said transportation vehicle when said transportation vehicle is delivered from said first rail to said second rail, said branched transporting mechanism having a first drive source for driving said transporting means and a second drive source for rotating said rotating mechanism, said rotating mechanism having a third drive source for receiving and delivering said transportation vehicle,
wherein said transporting means comprises a wire trained around pulleys, further comprising tension adjusting means selectively disposed near said branched transporting mechanism for adjusting the tension of said wire when necessary, and wherein said rotating mechanism has a mechanism for holding said transportation vehicle, a drive roller driven by said third drive source, and driven rollers, said drive roller and said driven rollers contacting said transportation vehicle to receive and deliver the transportation vehicle.

2. A workpiece feeding apparatus having a feeding apparatus for feeding a workpiece on a plurality of rails held in an elevated position, said feeding apparatus comprising:
a branched transporting mechanism disposed between said rails which are arranged in a crisscross pattern;
transporting means for moving along said rails; and
a non-self-propelled transportation vehicle for transporting the workpiece by engaging and disengaging said transporting means;
wherein said branched transporting mechanism receives said transportation vehicle transported by said transporting means and a first one of the rails and delivers said transportation vehicle to a second one of the rails, said branched transporting mechanism having a rotating mechanism for rotating said transportation vehicle when said transportation vehicle is delivered from said first rail to said second rail, said branched transporting mechanism having a first drive source for driving said transporting means and a second drive source for rotating said rotating mechanism, said rotating mechanism having a third drive source for receiving and delivering said transportation vehicle,
wherein said transporting means comprises a wire trained around pulleys, further comprising tension adjusting means selectively disposed near said branched transporting mechanism for adjusting the tension of said wire when necessary, and wherein said transportation vehicle has a wire gripping and releasing mechanism, said branched transporting mechanism having wire grip release plates for abutting against said wire gripping and releasing mechanism to release said wire from said wire gripping and releasing mechanism.

3. A workpiece feeding apparatus having a feeding apparatus for feeding a workpiece on a plurality of rails held in an elevated position, said feeding apparatus comprising:
a branched transporting mechanism disposed between said rails which are arranged in a crisscross pattern;
transporting means for moving along said rails; and
a non-self-propelled transportation vehicle for transporting the workpiece by engaging and disengaging said transporting means;
wherein said branched transporting mechanism receives said transportation vehicle transported by said transporting means and a first one of the rails and delivers said transportation vehicle to a second one of the rails, said branched transporting mechanism having a rotating mechanism for rotating said transportation vehicle when said transportation vehicle is delivered from said first rail to said second rail, said branched transporting mechanism having a first drive source for driving said transporting means and a second drive source for rotating said rotating mechanism, said rotating mechanism having a third drive source for receiving and delivering said transportation vehicle, and
a wire gripping device for bringing said non-self-propelled transportation vehicle into engagement with said moving wire to feed the transportation vehicle to a desired position and releasing said transportation vehicle from the wire at said desired position,
said wire gripping device having first clamp means and second clamp means mounted on said transportation vehicle;
wherein said first clamp means has a pair of first eccentric cams, first urging means for moving said first eccentric cams to bring cam surfaces thereof closely to each other when said wire rotates in said normal direction, and a pair of first gears for rotating said first eccentric cams in synchronism with each other; and
said second clamp means has a pair of second eccentric cams, second urging means for moving said second eccentric cams to bring cam surfaces thereof closely to each other when said wire rotates in said reverse direction, and a pair of second gears for rotating said second eccentric cams in synchronism with each other;
wherein said first clamp means clamps said wire when said wire rotates in a normal direction and said second clamp means unclamps said wire when said wire rotates in said normal direction, and said first clamp means unclamps said wire when said wire rotates in a reverse direction and said second clamp means clamps said wire when said wire rotates in said reverse direction.

4. A workpiece feeding apparatus according to claim 3, further comprising a pair of first cam spreading means for forcibly spreading said first eccentric cams away from each other, and a pair of second cam spreading means for forcibly spreading said second eccentric cams away from each other.

5. A workpiece feeding apparatus according to claim 3, wherein said first clamp means comprises:
a pair of first grip members for gripping said wire over a predetermined range;
a pair of first rotational members for displacing said first grip members toward or away from said wire while keeping said first grip members substantially parallel to said wire; and first urging means for urging said first rotational members in a predetermined direction to bring said first grip members closely to each other at all times, wherein said second clamp means comprises:

a pair of second grip members for gripping said wire over a predetermined range;

a pair of second rotational members for displacing said second grip members toward or away from said wire while keeping said second grip members substantially parallel to said wire; and second urging means for urging said second rotational members in a predetermined direction to bring said second grip members closely to each other at all times.

6. A workpiece feeding apparatus according to claim 5, wherein said first clamp means has a first parallel crank mechanism for keeping said first grip members substantially parallel to said wire, and said second clamp means has a second parallel crank mechanism for keeping said second grip members substantially parallel to said wire.

7. A workpiece feeding apparatus according to claim 5, wherein said first clamp means has a pair of first gears for rotating said first rotational members in synchronism with each other, and said second clamp means has a pair of second gears for rotating said second rotational members in synchronism with each other.

8. A workpiece feeding apparatus according to claim 5, wherein said first clamp means has a pair of first wire grip release means for forcibly releasing said wire from said first grip members, and said second clamp means has a pair of second wire grip release means for forcibly releasing said wire from said second grip members.

9. A workpiece feeding apparatus having a feeding apparatus for feeding a workpiece on a plurality of rails held in an elevated position, said feeding apparatus comprising:

a branched transporting mechanism disposed between said rails which are arranged in a crisscross pattern;

transporting means for moving along said rails; and a non-self-propelled transportation vehicle for transporting the workpiece by engaging and disengaging said transporting means;

wherein said branched transporting mechanism receives said transportation vehicle transported by said transporting means and a first one of the rails and delivers said transportation vehicle to a second one of the rails, said branched transporting mechanism having a rotating mechanism for rotating said transportation vehicle when said transportation vehicle is delivered from said first rail to said second rail, said branched transporting mechanism having a first drive source for driving said transporting means and a second drive source for rotating said rotating mechanism, said rotating mechanism having a third drive source for receiving and delivering said transportation vehicle;

a workpiece transfer apparatus for transporting workpieces having different shapes between working blocks, said workpiece transfer apparatus comprising:

a plurality of positioning plates having space areas complementary to the profiles of said workpieces, respectively; and a drop prevention plate for preventing said workpieces from dropping off;

said positioning plates being stacked such that an upper positioning plate has a large space areas and a lower positioning plate has a small space areas, said drop prevention plate being disposed beneath the lowest positioning plate.

10. A workpiece feeding apparatus according to claim 9, wherein said positioning plates include a first positioning plate having a first space area and a second positioning plate disposed beneath said first positioning plate and having a second space area, wherein if said second positioning plate has a third space area extending out of said first space area of said first positioning plate, then said first space area of said first positioning plate is enlarged to cover said third space area.

11. A workpiece feeding apparatus according to claim 9, wherein said space area of each said positioning plate comprises a space area covering the profile of the workpieces in a reference posture and the profile of the workpieces in a posture which is turned a predetermined angle from said reference posture.

12. A workpiece feeding apparatus having a feeding apparatus for feeding a workpiece on a plurality of rails held in an elevated position, said feeding apparatus comprising:

a branched transporting mechanism disposed between said rails which are arranged in a crisscross pattern;

transporting means for moving along said rails; and a non-self-propelled transportation vehicle for transporting the workpiece by engaging and disengaging said transporting means;

wherein said branched transporting mechanism receives said transportation vehicle transported by said transporting means and a first one of the rails and delivering said transportation vehicle to a second one of the rails, said branched transporting mechanism having a rotating mechanism for rotating said transportation delivers said transportation vehicle is delivered from said first rail to said second rail, said branched transporting mechanism having a first drive source for driving said transporting means and a second drive source for rotating said rotating mechanism, said rotating mechanism having a third drive source for receiving and delivering said transportation vehicle; and a workpiece transfer apparatus for transferring a workpiece fed by said transportation vehicle to at least a working position and a transporting position, said workpiece transfer apparatus having a workpiece placement table vertically movable by a drive mechanism, said workpiece placement table having a first workpiece placement surface and a second workpiece placement surface which are vertically spaced from each other by a predetermined distance, said drive mechanism being capable of vertically moving said workpiece placement table and of positioning either one of said first workpiece placement surface and said second workpiece placement surface in a fixed position to place or release a workpiece on said transportation vehicle, said second workpiece placement surface having a passage for said transportation vehicle to pass therethrough.

13. A workpiece feeding apparatus according to claim 12, wherein said workpiece transfer apparatus has a fixing device for positioning and fixing the transportation vehicle with the workpiece placed thereon.

14. A workpiece feeding apparatus according to claim 12, wherein said first and second workpiece placement surfaces are disposed in lower and upper positions, respectively, and said second workpiece placement surface disposed in the upper position has a gap into which said transportation vehicle enters horizontally.

* * * * *